United States Patent [19]

Mock et al.

[11] Patent Number: 5,414,618
[45] Date of Patent: May 9, 1995

[54] IRRIGATION CONTROLLER WITH ANALOG DATA INPUT DEVICES

[75] Inventors: Gerald L. Mock, Corona; Alberto D. Benmergui, Alto Loma; Uzair Siddiqui, Riverside, all of Calif.

[73] Assignee: The Toro Company, Minneapolis, Minn.

[21] Appl. No.: 172,518

[22] Filed: Dec. 21, 1993

Related U.S. Application Data

[60] Division of Ser. No. 37,495, Mar. 24, 1993, Pat. No. 5,272,620, which is a continuation of Ser. No. 554,685, Jul. 18, 1990, abandoned.

[51] Int. Cl.⁶ .............................................. G06F 15/46
[52] U.S. Cl. ................................. 364/140; 364/142; 364/145; 239/70
[58] Field of Search ........................ 364/140-147, 364/420; 239/67-70, 63; 137/78.2, 78.3, 624.12, 624.11

[56] References Cited

U.S. PATENT DOCUMENTS

| | | | |
|---|---|---|---|
| 4,333,490 | 6/1982 | Enter, Sr. ....................... | 137/78.3 |
| 4,396,149 | 8/1983 | Hirsch ............................ | 239/69 |
| 4,567,563 | 1/1986 | Hirsch ............................ | 239/69 |
| 4,837,731 | 6/1989 | Levine et al. ................... | 364/145 |
| 5,193,570 | 3/1993 | Mott ............................... | 237/70 |
| 5,272,620 | 12/1993 | Mock et al. ..................... | 364/145 |

*Primary Examiner*—Roy N. Envall, Jr.
*Assistant Examiner*—Thomas E. Brown
*Attorney, Agent, or Firm*—James W. Miller

[57] ABSTRACT

An improved irrigation controller of solid state design utilizes a microcomputer which retains and executes a watering schedule. A plurality of analog data input devices are provided with one input device being assigned to input one value of at least one watering schedule parameter having a number of possible values. Each analog data input device comprises a potentiometer, connected between high and low reference voltages, which has a variable output voltage determined by the setting or position of the input device on the controller housing, with different output voltages representing different values of the parameter. The output voltage is determined by charging a capacitor using a constant current source and by timing how long it takes the capacitor to reach the output voltage. The same capacitor is used for all of the analog data input devices to remove any variability in how different capacitors charge. In addition, the actual instantaneous high and low reference voltages are also read when the output voltage of at least one analog data input device is read.

10 Claims, 20 Drawing Sheets

SELF TEST - CONTINUED

IRRIGATION CONTROLLER WITH ANALOG DATA INPUT DEVICES

This application is a divisional of application Ser. No. 08/037,495, filed Mar. 24, 1993, U.S. Pat. No. 5,272,620, which is a continuation application Ser. No. 07/554,685, filed Jul. 18, 1990, now abandoned.

TECHNICAL FIELD

The present invention relates to an irrigation controller for initiating and terminating timed irrigation cycles in an irrigation system pursuant to a watering schedule that may be programmed by the user. More particularly, the present invention relates to an electronic irrigation controller incorporating a microcomputer.

BACKGROUND OF THE INVENTION

Irrigation controllers are known for controlling the operation of an irrigation system in accordance with the passage of time. Most controllers operate a plurality of watering stations and will retain or store a watering schedule established by the user. This schedule typically allows the user to pick what days the sprinklers will operate, what time of day that irrigation will begin, and how long each station will operate. Some controllers allow multiple watering schedules to be stored.

Some controllers are electromechanical in nature, using mechanical timing wheels and the like with pins being used to select some of the various parameters. Other controllers are electronic and include microcomputers into which the watering schedule may be programmed. The microcomputer will monitor the passage of time and execute the schedule at the appropriate times.

While known controllers are effective, they have various disadvantages. Electromechanical controllers are not as versatile or as programmable as electronic controllers. However, most electronic controllers do not readily display to the user the watering schedule or schedules in memory. Various keys or buttons have to be accessed to cycle through the and display the stored schedule. Thus, some of these controllers are not as user friendly as is desirable.

SUMMARY OF THE INVENTION

It is an aspect of this invention to provide an improved irrigation controller which is easier and more versatile to use.

One aspect of this invention is to provide an improved irrigation controller for individually and automatically controlling water flow to a plurality of individual watering stations in accordance with a programmed watering schedule over a period of days. The controller includes a single mechanically operated button for preventing operation of all scheduled watering for a rain delay period comprising a number of days equal to the number of times the button is pushed, the scheduled watering automatically resuming at the expiration of the rain delay period.

Another aspect of this invention is to provide an improved irrigation controller which includes display means for displaying the time and day to the user and data input means for allowing the user to input a watering schedule comprising certain parameters including which days in a predetermined period are to be active days in which irrigation is allowed, which time of day on an active day irrigation is to start, and how long each station is to run in an irrigation sequence following a start time. Finally, the controller includes a microcomputer means connected to the data input means and display means for performing the following functions: executing the programmed watering schedule in accordance with the passage of time; and monitoring the data input means to detect when a change in at least one of the start or run times is being input and to display the new value for the changed parameter in the display means during the period in which the parameter is being changed and for a predetermined time period following completion of the change.

Yet another aspect of this invention is an improved irrigation controller including a variable potentiometer for inputting into the schedule at least one variable of the schedule. The potentiometer is connected between high and low reference voltages and has an output at which an output voltage may be read by means including a capacitor charged by a constant current source to charge in a more linear manner. In addition, the setting for the potentiometer is derived by means which utilizes the actual high and low reference voltages existing across the potentiometer to calibrate the setting.

Finally, another aspect of this invention is an improved irrigation controller having data input means, display means of first and second types, and output switches connected to corresponding watering stations. The controller also includes microcomputer means connected to the data input means, display means and output switches for performing the following functions: 1) storing the watering schedule input by the user through the data input means; 2) executing the programmed watering schedule in accordance with the passage of time by closing the appropriate output switches at the appropriate times and for the appropriate durations stored in the schedule; 3) driving the first and second display means to cause them to display appropriate information; and 4) selectively and temporarily suspending execution of the watering schedule and testing the operability of at least one of the following components: the data input means, the first and second display means, and the output switches.

BRIEF DESCRIPTION OF THE DRAWINGS

The present invention will be described in more detail in the following Detailed Description, taken in conjunction with the following drawings, in which like reference numerals refer to like elements throughout.

FIGS. 10-12 illustrate the main control loop;

FIGS. 13-14 illustrate the reading and conversion process for the pots;

FIGS. 15-18 illustrate the monitoring of the pot settings and the storage and display of new genuine settings by the microprocessor;

FIGS. 19-21 illustrate the implementation of the rain delay feature; and

FIGS. 22-24 illustrate the self test feature.

DETAILED DESCRIPTION

The present invention relates to an irrigation controller 2 for beginning and ending irrigation cycles in an irrigation system in a timed manner. More specifically, controller 2 of this invention allows the user to select or program the following parameters of system operation:

which days the sprinklers will operate in a particular 14 day window (i.e. a calendar sequence) or the interval between successive operational days up to a maximum interval of 7 days (i.e. an interval sequence), the operational days being known as "active days";

when the sprinklers come on during the active days, known as the "start times", with up to three start times being selectable; and how long the sprinklers will run after each start, known as the "run times".

Controller 2 is adapted to control a plurality of separate watering "stations" in the irrigation system. Each station comprises one or more sprinklers grouped together to operate simultaneously off the same irrigation valve. The irrigation valve includes an actuator, such as an electrical solenoid, which is operated by a control signal from controller 2 to turn the valve on. Controller 2 of this invention is provided in different models operating 6, 9 or 12 stations. A 6 station controller is illustrated in FIG. 1.

In the case of the run time selection, the run times may be set individually for each separate station, i.e. separate stations may have different run times depending on operator preference. However, the selections of active days and start times apply to all stations as a group. Thus, when an active day and start time is reached, controller 2 will operate the irrigation system by sequencing through the stations and operating each station for the run time which has been set for that station. Sequential operation of the stations is preferred to decrease the demands on the needed water delivery capacity of the irrigation system.

Controller Overview

Figure 1:
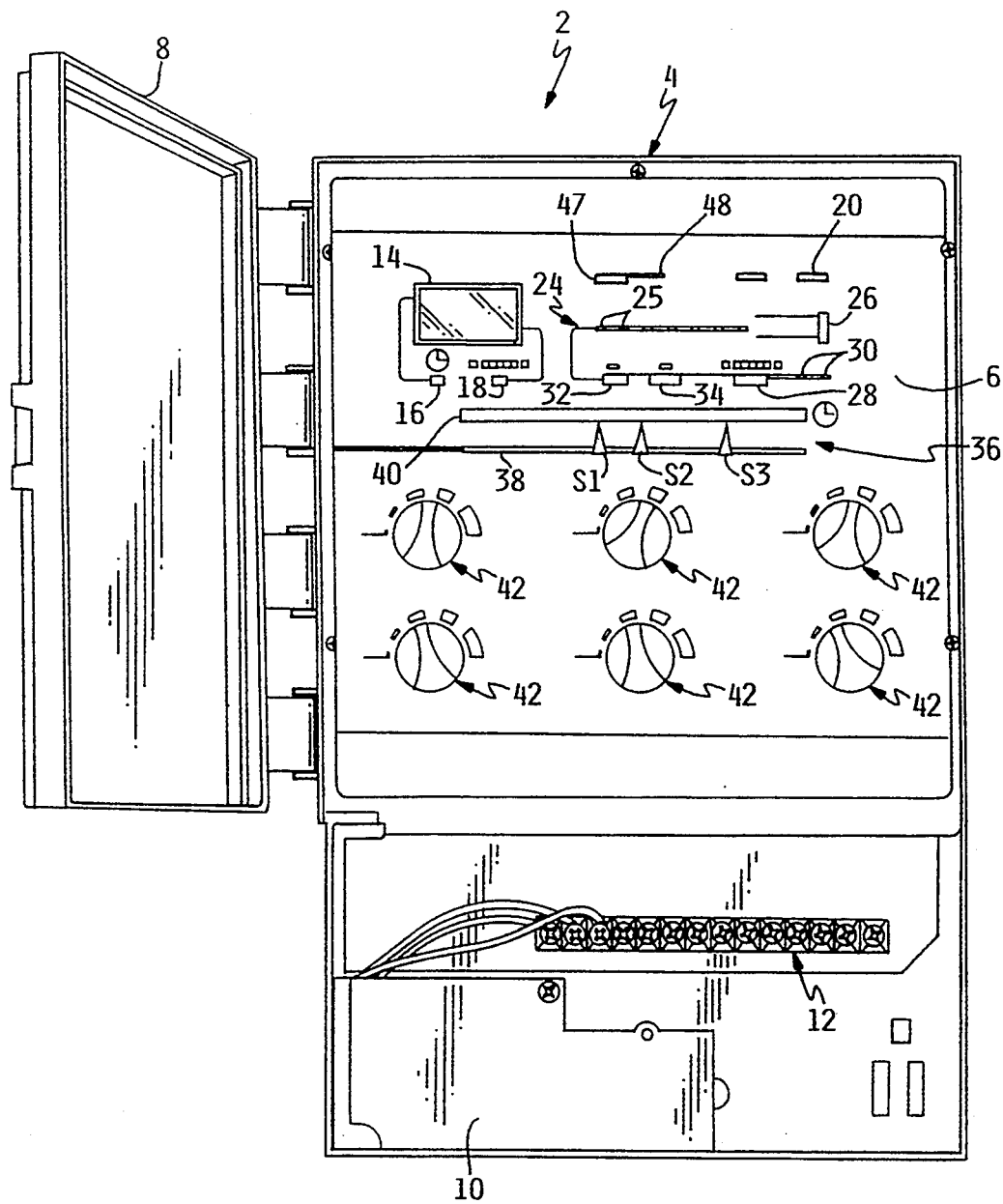
FIG. 1 is a side elevational view of an improved irrigation controller according to the present invention, particularly illustrating the controller cabinet and front panel with its associated controls and displays.

Referring to FIG. 1, the electronic components of controller 2 are contained within a cabinet 4 of any suitable design. Cabinet 4 may be mounted on a wall, pedestal or the like adjacent the irrigation system being controlled. Cabinet 4 includes a front panel 6 having various controls which may be manipulated by the user to activate control functions of controller 2 or input information into controller 2. In addition, controller 2 includes various display devices for displaying information to the user. A pivotal door 8 normally closes cabinet 4 and conceals front panel 6. Door 8 may be opened for accessing the controls or viewing the displays.

Figure 2:
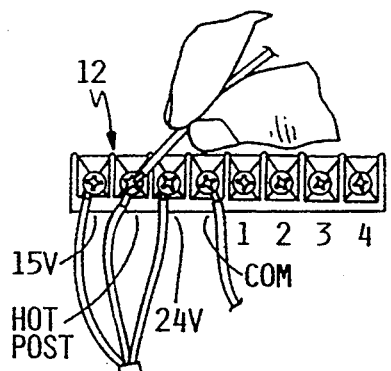
FIG. 2 is a partial side elevational view of the terminal strip of the controller shown in FIG. 1, particularly illustrating use of a hot post for determining station assignment.

A lower portion of controller 2 houses a transformer 10 and terminal strip 12 behind an easily removable access panel which panel is not shown in FIG. 1 for clarity. Transformer 10 will be wired to a standard A.C. power source such as 120 V A.C. power. Referring to FIG. 2, transformer 10 includes a 15 V A.C. output wired to a first terminal, labelled 15 V, on terminal strip 12 for powering the controller circuitry and related components. In addition, transformer 10 also includes a 24 V A.C. output wired to another terminal, labelled 24 V, on terminal strip 12. This 24 V terminal is electrically connected to a common terminal, labelled COM, on power strip 12. The COM terminal is connected to a common wire leading to all of the electrical solenoids of all the irrigation valves comprising the respective stations for carrying power to such solenoids. In addition, terminal strip 12 includes a plurality of numbered terminals, labelled 1, 2, 3, 4, and so on, wired to a single valve solenoid, respectively, for selectively completing the circuit to that solenoid when that numbered terminal is connected to ground, as will be described hereafter. Finally, terminal strip 12 has a terminal (not shown in FIG. 2) for supplying electrical power to the pump of the irrigation system whenever the pump is to be actuated for a particular irrigation cycle.

When installing controller 2, the control wires for connecting each valve solenoid to the numbered station terminals may be difficult to differentiate from one another, i.e. the installer is not sure which wire goes to which station. Desirably, terminal strip 12 also includes a terminal, labelled Hot Post in FIG. 2, which is connected to A.C. ground. Thus, when the common line to all solenoids is connected to the COM terminal and controller 2 is turned on supplying 24 V AC power along that line, the user can easily tell which control wire operates which station simply by touching it to the Hot Post as shown in FIG. 2 and by observing which station's sprinklers begin operating. The user can then connect that wire to the appropriate one of the numbered terminals corresponding to the desired station number assigned to that station. This makes wiring controller 2 quicker and easier, and reduces the risk of shorting the internal circuits of controller 2 during installation.

The LCD Display and Set Time and Set Day Buttons

Figure 3:
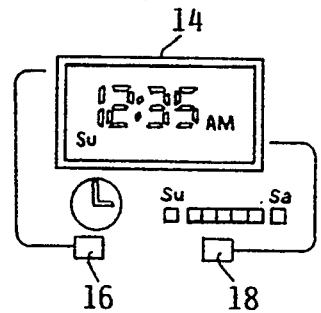
FIG. 3 is a side elevational view of the LCD display used in the controller of FIG. 1, with a typical day and time being shown in the LCD.

Front panel 6 includes an LCD display 14 for indicating the current day of the week and the current time of day. FIG. 3 shows a representative sample of the display format indicating that the current time is 12:35 in the morning on a Sunday. The time shown on the display is updated minute by minute by controller 2 as time elapses, with a change in day being effected at 12:00 midnight of every day.

Two push button controls are mounted on front panel 6 directly beneath LCD 14 for setting the current day and time in controller 2. Depressing the "set time" button 16 causes the minutes and hours digits to increment in a suitable fashion until the current time of day is displayed. Releasing set time button 16 at this point will then input that time into controller 2. Similarly, the "set day" button 18 may be sequentially depressed to cycle through the days of the week on display 14 until the current day is reached. This day will then be input into controller 2. Various indicia are located on front panel 6 for indicating to the user which button is which, i.e. set time button 16 is beneath the picture of a clock and the set day button 18 is beneath a diagrammatic representation of one week's worth of days.

The On/Off Button

Referring again to FIG. 1, controller 2 includes an on/off push button 20 on front panel 6 which enables or disables operation of controller 2. Each actuation of button 20 toggles controller 2 from "ON" to "OFF" or from "OFF" to "ON". In the "ON" mode, controller 2 shall perform its control functions and display 14 will read the current day and time. In the "OFF" mode, no controller functions will be operative and display 14 will read "OFF".

As noted, controller 2 is hardwired to a 120 Volt A.C. power source. If the incoming power to controller 2 fails for any reason, this is detected by controller 2. Then, when the power is reestablished, controller 2 will blink or flash LCD 14 to indicate to the user that a power failure has taken place. This alerts the user that the current time and day has to be reset in controller 2 to ensure proper controller operation.

The Active Days Display and Related Controls

A row 24 of LED display devices 25 is contained on front panel 6 adjacent a two position slide switch 26 for selecting either a "calendar cycle" or an "interval cycle". In the calendar cycle, particular LED's 25 in row 24 are illuminated in the "ON" mode to indicate which days are active days. There are seven such LED's 25 labelled as days of the week above the LED row 24 or as particular interval days in a 7 day interval cycle below the LED row. Thus, when the calendar cycle has been selected and controller 2 has been programmed to have Sunday, Monday and Friday be active, the LED's 25 beneath the Su, Mo and Fr labels will be lit and all of the other LED's 25 will be unlit.

When the interval cycle has been selected by appropriate positioning of switch 26, controller 2 can be programmed to be active every day, every second day, every third day, or so on up to a maximum interval of every seven days. Only one interval can be selected depending on the interval desired by the operator between the active days. As an example, when controller 2 has been programmed to be active every third day, then the LED 25 above the label 1:3 will be lit.

A "set week" push button 28 is located beneath LED row 24. This push button is used to select either the first week or the second week in a 14 day calendar cycle. In other words, when slide switch 26 is positioned to first select a calendar cycle, then the active days in two consecutive weeks may be programmed by the user and/or displayed by LED row 24. Two additional LED's 30 indicate which week is currently being programmed or displayed, i.e. week 1 or week 2.

The actual selection of the active days, in either the calendar or interval mode, is made using a "days" push button 32 and a "set" push button 34. When controller 2 is in the calendar mode, days push button 32 is used to sequence through all 7 days in a one week cycle beginning with Sunday of the week that has been selected by the set week push button 28. Sequentially depressing the days push button 32 then moves from one day to the next, i.e. from Sunday to Monday and so on. The set push button 34 is used to toggle the status of the selected day from active to inactive or vise versa. For example, if Sunday is selected and that day was already active, then depressing the set push button 34 once would toggle Sunday from active to inactive. Then, this inactive status for Sunday would be retained when the days push button 32 is next depressed to move on to Monday. The programming cycle is automatically stopped by controller 2 if neither the days or set push buttons 32 and 34 are activated within a predetermined time period, e.g. 5 seconds.

If the interval mode has been selected by the slide switch 26, then the days and set push buttons 32 and 34 work somewhat differently. The interval mode programming sequence is begun by depressing the days push button 32 which selects the first interval, i.e. every day which is the interval labelled 1:1. Then, sequential depression of the set push button 34 cycles through the other possible interval choices. After the desired interval is reached, say every 5th day which is the interval labelled 1:5, this interval can be then be selected for use by again depressing the days push button 32. Selection of any interval which is different from the previously selected interval causes the previously selected interval to be automatically disabled.

The Start Time Controls

Figure 4:
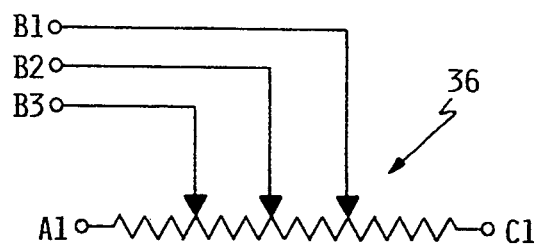
FIG. 4 is a schematic diagram of the three position slide pot used to set start times in the controller of FIG. 1.

Controller 2 includes a unique slide potentiometer 36 for setting multiple start times for each active day. The slide pot 36 may be of generally conventional design and comprises a variable resistance device. However, the slide pot includes three individual sliders S1, S2, and S3 which may each be individually moved along a single slideway 38 contained in front panel 6 of controller 2. The sliders S1–S3 are connected to individual electrically conductive wiper elements B1–B3 that are in contact with a common resistance element as diagrammatically shown in FIG. 4. When the resistance element of pot 36 is connected between high and low reference voltages, equal to a full on or a full off condition for the pot, the voltages can be individually read for each slider S1–S3 at the contacts of wipers B1, B2 and B3. These voltages will be used in a manner described hereafter to derive a setting for the slider equivalent to a particular start time.

When the sliders S1–S3 are moved full left in slideway 38, they will be in a zone in which no start times will be selected, i.e. each slider wiper B1–B3 will be at the beginning A1 of the resistance element. One start time will be selected by moving the end slider S3 to the right until it is adjacent the desired start time as shown on the indicia or scale 40 mounted on front panel 6 above the slideway. The second and third start times can be selected, if desired, by moving the other sliders S2 and S1 to the right until they are also generally adjacent the desired times. For example, the slider positions indicated in FIG. 1 would indicate three start times for every active day, i.e. at approximately 6 a.m., 10 a.m., and 7 p.m. Any re-adjustment of any selected values can be simply carried out by moving the selected slider from its current position in the slideway to the new desired position.

The slide pot 36 of controller 2 is an effective and simple way to select multiple start times and to graphically display those times to the user. One glance at the slide pot is sufficient to tell whether one, two or three start times have been selected, and approximately when those start times are. The user need not manipulate any switches or buttons to sequentially display the start times on LCD 14. In addition, there is no need to look at multiple mechanical switches or pots for reading the different start times. Thus, space is saved on front panel 6 while giving the user maximum ease and readability as to start time information.

The scale 40 which is printed on front panel 6 above slideway 38 is sufficiently accurate to give the user an approximate idea of the various selected start times for general informational purposes. However, as will be described in more detail hereafter, controller 2 monitors the position of sliders S1-S3 to determine whether the user is in the process of making a change in that start time. If a change is detected, then controller 2 stops displaying the current time and day in the LCD readout and begins displaying the exact values, within the limits of the controller's specifications, of the start time for the slider whose position is being changed. Controller 2 is designed to store and display the start time values in 10 minute increments. This start time will change in the display as movement of the slider continues until a "new" start time is displayed corresponding to the final position of the slider. This new start time will be displayed for a predetermined period of time after movement of the slider stops, after which the LCD display will revert to displaying the current time and day.

Thus, a fairly accurate reading of the slider setting, converted by controller 2 into the time of day for that particular start time, will be displayed to the user as he adjusts the sliders S1-S3 of slide pot 36. This can be conveniently used to get an accurate reading of the current setting simply by slightly moving the slider out of its current position and then returning it to its current position.

The Run Time Controls

Figure 5:
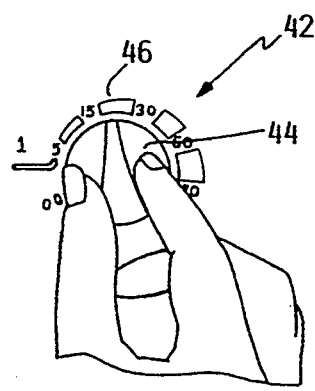
FIG. 5 is a side elevational view of one of the rotary pots used to set run times in the controller of FIG. 1, particularly illustrating the adjusting knob of the pot and its associated scale.

Controller 2 includes a plurality of rotary dial potentiometers 42 equal to the number of stations for which controller 2 is designed, i.e. a 6 station controller has 6 such potentiometers 42 as shown in FIG. 1. Each such potentiometer 42 is a variable resistance device whose setting is adjusted or altered by rotating the input shaft of the potentiometer. Rotary pots 42 are used to set the run times for the watering stations, one pot 42 being used for each station. Referring to FIG. 5, the shafts of the rotary pots project through front panel 6 and mount adjusting knobs 44 which the user can use to rotate the shaft and vary the pot setting. Again, a suitable scale 46 is placed next to each pot for visually indicating the amount of run time for each station. Each pot 42 is also numbered to indicate what station it controls. Pot 42 shown in FIG. 5 is for station 1 as indicated by the numeral "1" to the left of scale 46.

Each run time pot 42 has an off or "0" setting corresponding to no run time for that station. The run times can be adjusted in one minute increments up to a total of 90 minutes for each station. As was the case for the start time pot, each run time pot 42 is also monitored by controller 2 to detect a change, and to then use the LCD to display the new setting to the user. Again, this feature will be described in more detail later.

Again, the use of individual rotary pots 42 is effective in demonstrating the various station run times to the user. The information is visually and graphically displayed simply by glancing at the run time pots 42. The user can get a precise indication of the station run time simply by slightly adjusting a particular pot and watching the LCD as it displays the run time. Thus, a maximum of convenience and usability is provided.

The Rain Delay Control and Display

Irrigation controllers, such as controller 2 shown herein, when operating in their automatic mode will cause the sprinkling system to operate in accordance with the stored program regardless of environmental conditions. In other words, controller 2 will turn the sprinklers on at the appropriate start times on an active day even if it is raining. This is obviously wasteful of water as the system in most cases need not operate if it is raining or it is expected to rain.

Thus, to give the user some flexibility in preventing controller operation, a rain delay push button 47 is located on front panel 6 of controller 2. This push button may be manually pushed by the user multiple times up to a maximum number, e.g. a maximum of four times. Controller 2 will count and store the number of times the push button is pushed as the number of days comprising a rain delay period, with the current day being counted as the first day of the rain delay period. For example, if the button is pushed twice, then the rain delay period will be two days expiring at 12:00 midnight of the day following the current day. All sprinkling operations which would normally be conducted during the rain delay period will be disabled by controller 2, i.e. no sprinkling will be allowed during the rain delay period. After the rain delay period elapses, normal automatic operation of controller 2 will resume.

Figure 6:
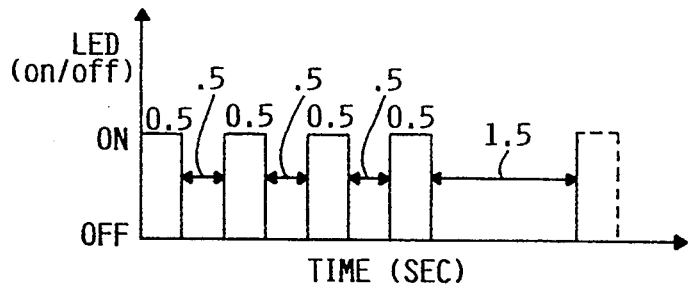
FIG. 6 is a schematic diagram of a flash pattern that is lit to indicate a four day rain delay during operation of the controller after the rain delay button has been pushed four times.

An LED display 48 is adjacent rain delay button 47 and is activated whenever the rain delay feature has been implemented. Controller 2 blinks or flashes the LED to signify to the user how many days remain in the rain delay period. Various blink patterns could be used to convey this information with one blink pattern being indicated in FIG. 6 for a four day delay. In this pattern, there are four quick 0.5 second flashes separated by a 1.5 second pause before the flash pattern repeats. Thus, a user will see four quick flashes on LED 48, a pause, four quick flashes, another pause, and so on, signifying that four day's remain in the rain delay period. When the first day of the rain delay elapses, the rain delay count decreases to three, and the flash pattern is changed to three flashes before the pause, and so on.

The rain delay feature of controller 2 is advantageous. It allows the user to easily disable controller 2 for an adjustable time period depending on the user's preference. For example, if it is currently raining and rain is expected to continue for a number of days, e.g. for a total of three days, the user can easily disable controller 2 operation simply by pushing the rain delay button 47 the required number of times, e.g. three. Controller 2 will automatically resume its normal operation after that number of days passes.

In addition, the LED 48 will continuously display the rain delay count to the user during the rain delay period. Thus, if it stops raining sooner than expected, the user can simply go up to controller 2 to see how many days remain in the rain delay. If too many days remain and the user wishes to cancel the rain delay feature, he need only push the rain delay button 47 until the rain delay count increments above four, at which point it is reset to zero. The rain delay count can also be reset by depressing and holding button 47 for more than two seconds. The ability to see how many days currently remain in the rain delay period will enhance user confidence in this feature as it gives the user the ability to correlate the rain delay with actual environmental conditions and cancel it if need be.

Controller Block Diagram

Figure 7:
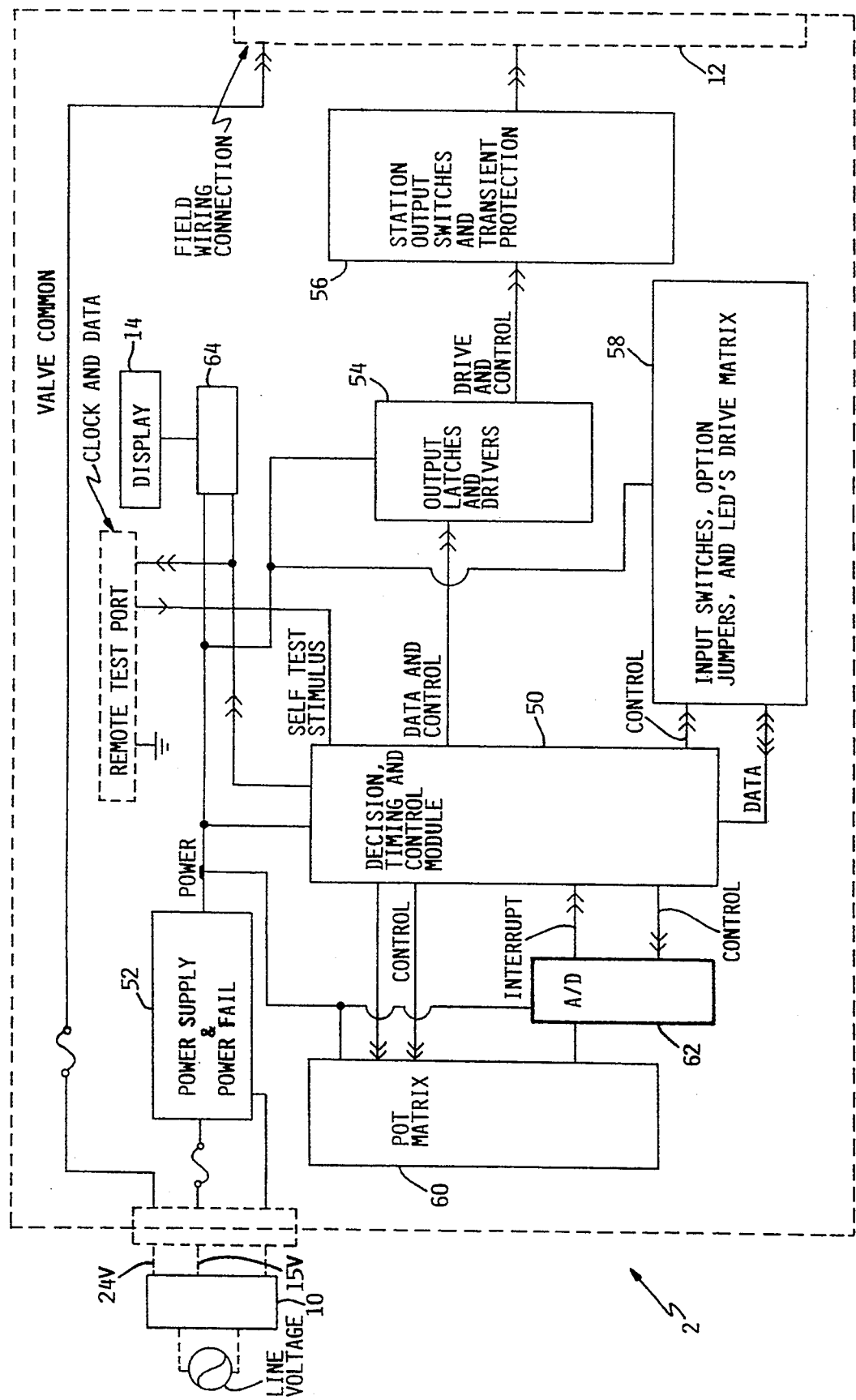
FIG. 7 is a block diagram of the controller of FIG. 1, particularly illustrating the major functional blocks of the controller.

Referring now to FIG. 7, controller 2 is based on a microcomputer 50 of any suitable design which comprises a timing, memory, logic and control means. Microcomputer 50 includes a timer which takes timing information from the ticks of the incoming power supply in a known manner. In addition, microcomputer 50 includes random access memory (RAM) for storing user inputable information regarding the desired irrigation cycles and permanent ROM memory in which the basic programming of controller 2 is stored along with a default irrigation program for use in RAM. Microcomputer 50 monitors the passage of time and will initiate the irrigation cycles in accordance with whatever watering program is loaded into RAM, either a program inserted by the user or the default program.

As noted previously, an internal transformer 10 is used to convert the incoming 120 V A.C. power to 24 V A.C. along a first output and 15 V A.C. along a second output. The 15 V A.C. is used to generate power for the logic circuitry after passing through a power supply and power failure detect block 52 which also detects a power failure and signals that to microcomputer 50. The 24 V A.C. power is used to power the solenoid operated valves that control the individual watering stations when the circuit to each valve is completed by microcomputer 50 at the appropriate times and for the appropriate duration. In this regard, microcomputer 50 acts through various output latches and drivers, shown in block 54, to close appropriate output switches, shown in block 56, connected to the irrigation valves by the numbered terminals on terminal strip 12. These output switches can be conventional TRIACS. When the output switch to a particular valve is closed by microcomputer 50, then the 24 V circuit to that solenoid is completed, allowing the valve to open and irrigation of the station served by that valve to take place. The output switch remains closed for the run time selected for that station.

In addition, all of the push and slide button type switches in controller 2, e.g. the on/off button 20, the rain delay button 47, the select week button on 26, etc., as well as the LED's are coupled to microcomputer 50 through a matrix shown as block 58. The microcomputer uses this matrix 58 to read the switch positions, turn the LED's on, and read any jumpers used to convert any stations from sprinkling to drip operation. Further description of the jumpers and drip operation will not be provided herein as they are not essential to an understanding of the present invention.

The positions of the potentiometers, both the start time pot 36 and the run times pots 42, are read by one or more multiplexing modules connected to microcomputer 50 as block 60. This multiplexer block 60 is used to sequentially select an analog channel leading to one of the pots for reading. The pot setting which has been read is then converted into digital form in an analog to digital conversion process shown as block 62. Microcomputer 50 processes the pot information immediately after each channel is read, and then proceeds to select the next channel, as will be described more fully in the description of controller operation.

Figure 8A:
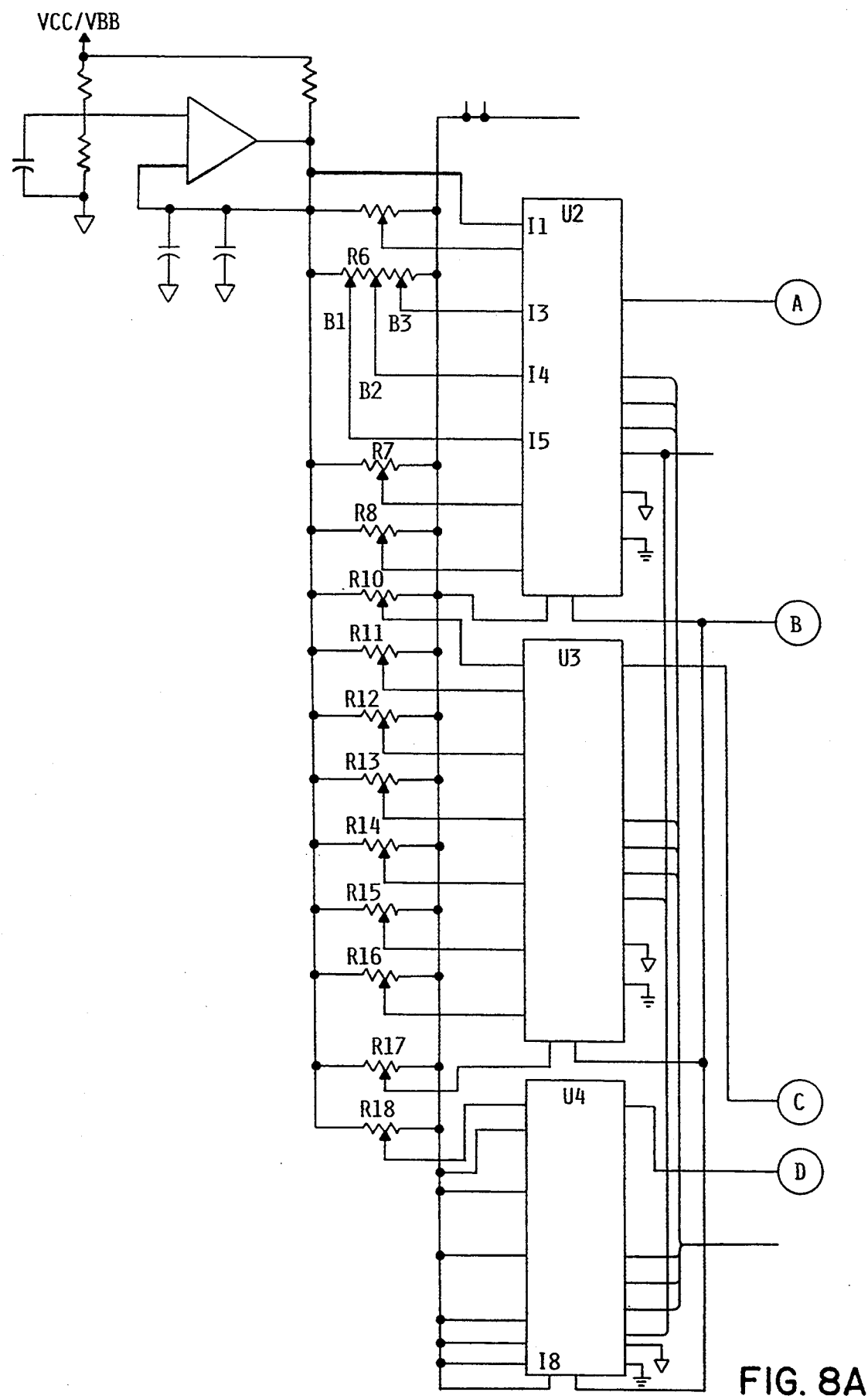
FIG. 8 is an expanded circuit diagram of a portion of the circuitry of the controller shown in FIG. 1, particularly illustrating the pots and associated circuitry for reading the pot settings.
Figure 8B:
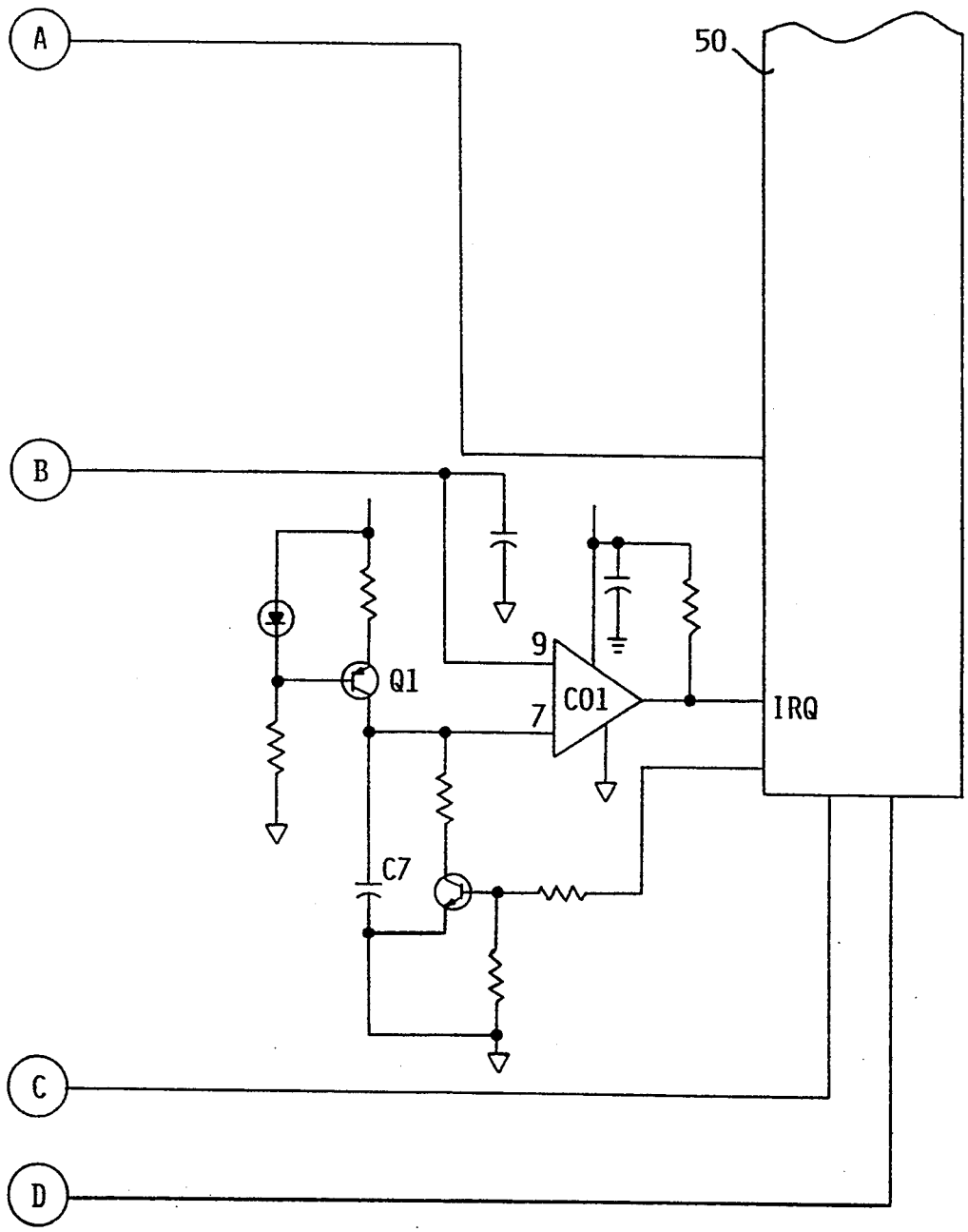

A more complete diagram of that portion of the circuit dealing with the potentiometer's 36 is illustrated as FIG. 8. In that circuit, the various potentiometers are shown as various resistances R6–R18. The first resistance R6 is the three position slide pot 36 for the start times, with the three wipers B1, B2 and B3, coming off the resistor and being read into three inlets I3, I4 and I5 of the multiplexer module U2. Three multiplexer modules U2, U3, and U4 are used to provide sufficient channels for a 12 station controller, the resistances R7–R18 individually representing one of the run time pots 42 in a 12 station controller. In addition, two channels are used to sample the high and low reference voltages across which the pots are connected. The high reference voltage is read into the input I1 of module U2, while the low reference voltage is read into the input I8 of module U4. The numbers of modules used can be increased or decreased according to the number of analog channels that are required, e.g. a 6 station controller would only require two modules. Or, the separate modules shown herein could be replaced by a single module with more built-in channel capacity.

A known technique of reading a pot position is to compare the voltage read at the pot to the time it takes for a capacitor to charge to that same voltage. The capacitor is allowed to charge via commands under the control of a circuit or a microcomputer. This time is then measured by the microcomputer and is indicative of the pot setting, i.e. it is proportional to how far the shaft or slider of the pot has been moved from its off position. Unfortunately, capacitors in prior art controllers do not charge linearly over the upper ends of their ranges. Thus, a pot which has been set to provide a particular run time, for example, might be read as requiring a greater run time due to the non-linear way in which a capacitor charges. This is a source of annoyance for users of irrigation controllers.

Figure 9:
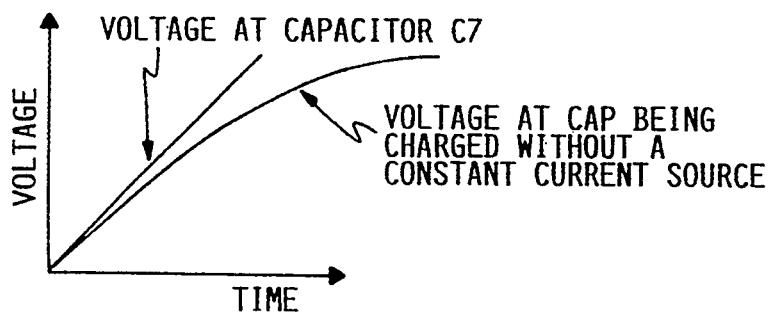
FIG. 9 is a diagram of how the capacitor used for measuring the pot readings of the pots in the controller of FIG. 1 charges from a constant current source versus one charged in the prior art manner from a non-constant current source.

In the present controller, the outlets of the multiplexer modules U2–U4 are all connected to the input 9 of a comparator CO1 for reading in the voltage at any particular pot to the comparator. A single charging capacitor C7 is connected to the collector of a transistor Q1 whose purpose is to charge the capacitor using a constant current. This is a unique feature of controller 2 and enhances the accuracy with which the pots are read, particularly for the higher values of the pot, by removing the normal nonlinearity with which capacitor C7 charges. See FIG. 9 for charging curves of capacitor C7 and for a prior art capacitor. The voltage at capacitor C7 is monitored at the other input 7 of the comparator CO1. When the voltage at input 7 is equal to or slightly greater than the pot voltage at input 9, the comparator sends an interrupt signal to microcomputer 50 at input IRQ to stop the timing sequence. Thus, the time taken to charge the capacitor to the pot voltage is known, representing the analog position of the pot.

The use of the same capacitor for reading all the pots also helps enhance the accuracy of reading the pots. Different capacitors can charge in slightly different fashion, particularly as the capacitors age. However, in controller 2 of this invention, the same capacitor C7 is sequentially connected to all of the analog channels for use in reading the pots and in reading the maximum and minimum reference voltages for calibration purposes in a manner to be described. Moreover, the use of only one capacitor for all the channels, instead of separate capacitors for each channel, decreases the cost and complexity of controller 2. Thus, controller 2 is less expensive to manufacture.

Finally, microcomputer 50 drives the LCD display 14 through any appropriate driving device shown as block 64 in FIG. 7.

Operation Of Controller 2

The logical operations of microcomputer 50 will be explained by referring to FIGS. 10 which comprise a flowchart illustrating the some of the software operation of microcomputer 50. Not all of the operational steps will be described in detail as those skilled in the art could implement the corresponding steps or features described above in various known ways. However, certain steps relating to various specific features of controller 2 will be described in detail.

Figure 10:
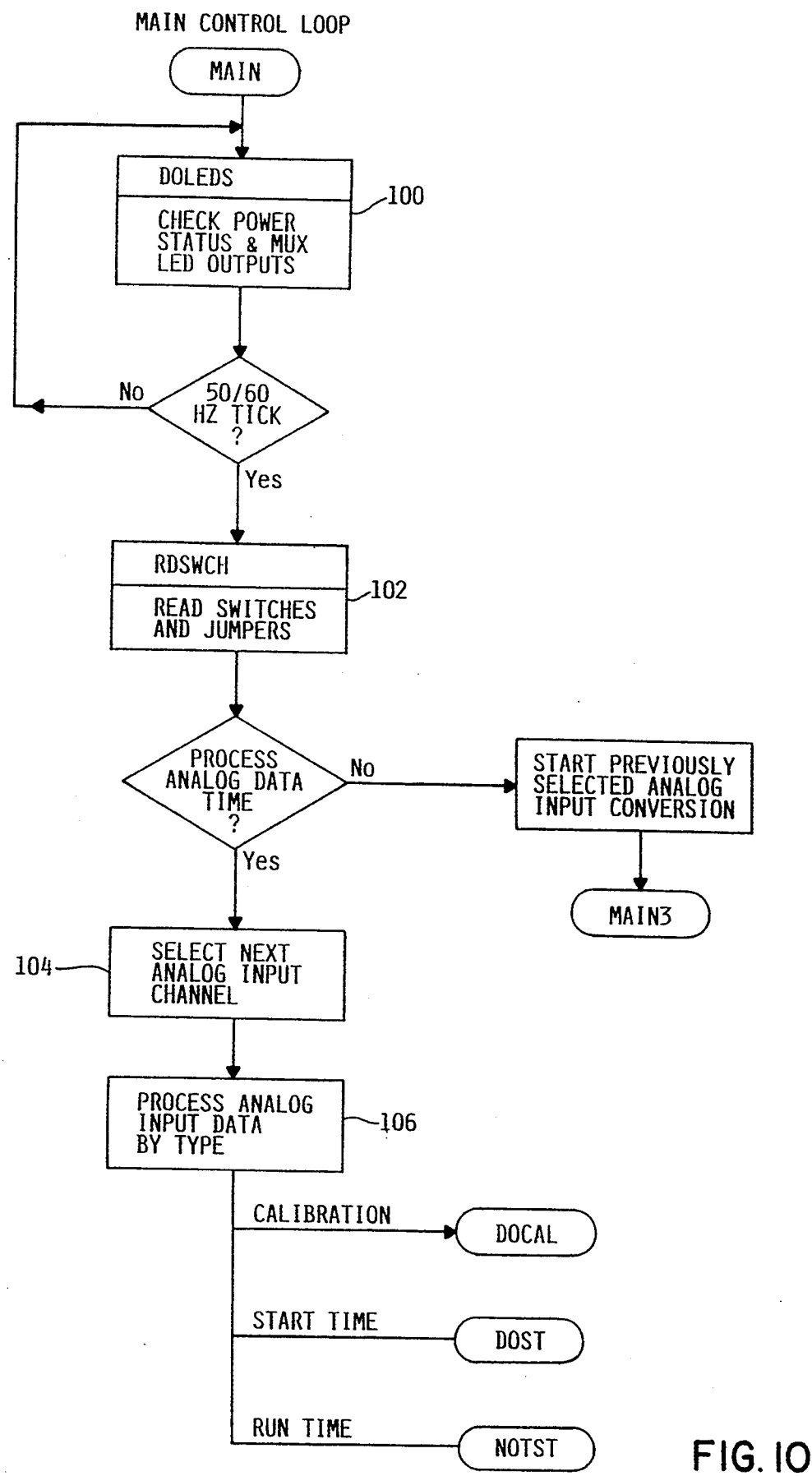
FIGS. 10-24 collectively comprise a flowchart illustrating many of the operations of the microprocessor of the controller broken down as follows.
Figure 11:
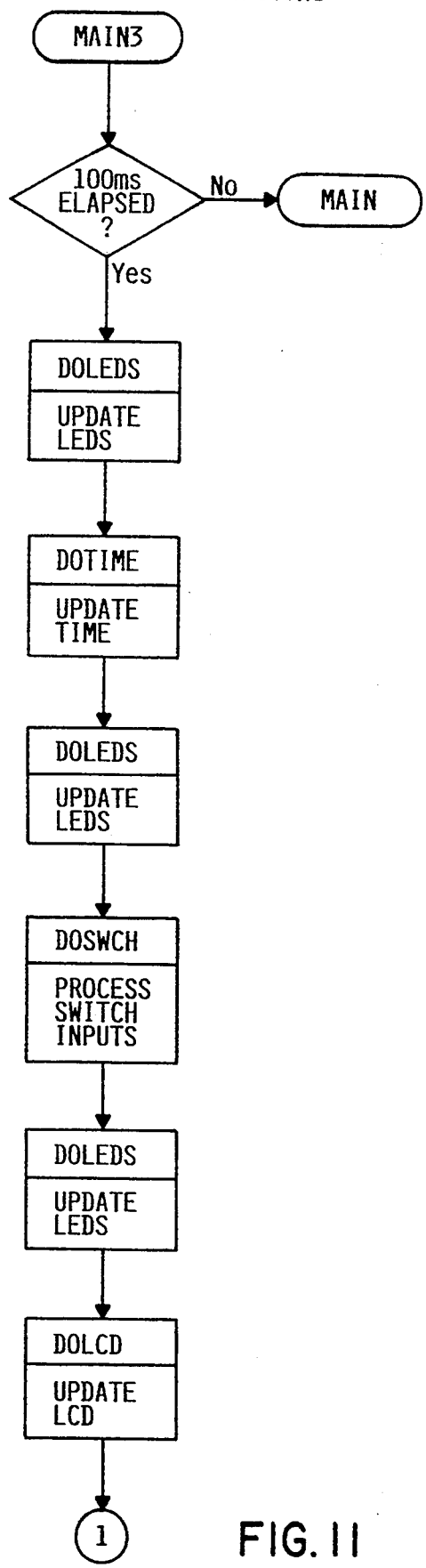
Figure 12:
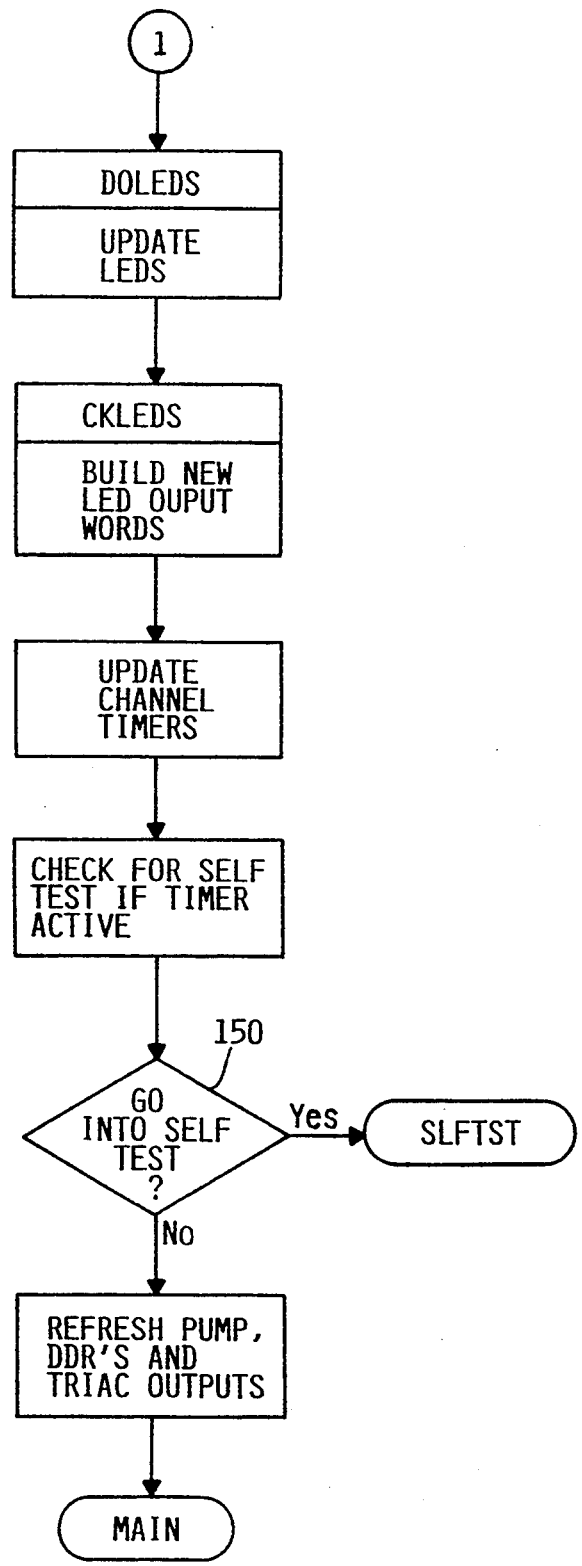

After an initialization sequence followed whenever controller 2 on/off switch is activated, or following a power failure, a main control loop shown collectively in FIGS. 10-12 is begun. Referring first to FIG. 10, the main control loop begins in a MAIN subroutine in a DOLEDS step 100. This is a step which periodically recurs throughout the main control loop and simply lights whatever LED's should be lit. The reason the DOLEDS step recurs is the need to refresh the LED's to prevent them from flickering, i.e. so that a lit LED appears to glow continuously when that is required.

The main control loop then looks to see whether a 50 or 60 hertz timing tick is being received from the power source, i.e. whether controller 2 is coupled to an American or European type A.C. power. If such a tick is received, microcomputer 50 then reads in step 102 the position of the various push and slide buttons, including the rain delay button 47, to determine if they are being pushed. However, this switch input information will not be processed until later in the main loop at the DOSWCH subroutine.

Reading and Converting the Analog Channels

The software then looks to the potentiometers 36 and 42 used to set the start and run times to sequentially read these pots, process the pot settings, and store the pot settings in memory. On the first tick of the clock, the software first selects in step 104 one analog channel in the multiplexer modules U2-U4 for use. Then, on the next tick of the clock, the software will in step 106 read the voltage in that channel, whether that voltage is the high or low reference voltage or a voltage at one of the pots, and process and store that information for subsequent use as will be described. The voltages are read as set forth above by measuring the time it takes for capacitor C7 to charge to the level of the voltage in this channel. When the analog channel represents a pot channel, the software then goes through a conversion process that will be described to provide a pot setting which microcomputer 50 can use and which is calibrated to be more accurate.

The conversion processes for the start and run time channels connected to the start and run time pots are similar. Only the start time conversion process represented by the DOST subroutine shown in FIGS. 13-14 will be described in detail. The run time conversion process represented by NOTST is similar in concept and will not be specifically described. However, before either of these subroutines, calibration data is first provided in a DOCAL subroutine.

In the DOCAL subroutine, the software first sequences through the channels connected to the high and low reference voltages and reads and stores those voltages, expressed as maximum and minimum charging times, i.e. the time needed to charge the capacitor C7 to those levels. Note that these are the actual reference voltages used for the pots, rather than some theoretical maximum or minimum, and the actual time that capacitor C7 takes to reach those voltages. Thus, even if the reference voltages should change over time due to component aging, or the charging characteristics of the capacitor should vary slightly as the capacitor ages, the actual voltages are still being read by the same capacitor as will be used to read the pots. Thus, sources of error due to component aging are eliminated in the conversion process to be described now.

After the calibration data is stored, the software then sequentially cycles through all of the analog channels connected to the start or run time pots and processes and stores the pot settings. Referring now to the DOST subroutine, the first step 108 after setting a threshold is labelled CT2STG. In this step shown in FIG. 14, the software uses the calibration data and first subtracts the maximum conversion time from the minimum conversion time to get a range. The range is divided by a number of steps required for the particular data type to provide a step size. For start times, 204 steps are used. Next, the software subtracts the minimum conversion time for the channel from the actual time and divides that by the step size. The actual conversion time is the time it takes capacitor C7 to charge to the voltage read in the pot channel. This will give the current setting for the pot expressed as a number of steps between 1 and 204. A guard band of 30 steps is provided on either side of the range, i.e. settings expressed as 0-30 steps will be interpreted as 0 and settings expressed as 194-204 steps will be interpreted as a reading of 145. Thus, settings between 30 and 174 will be interpreted as pot readings of 1-144, respectively.

Figure 13:
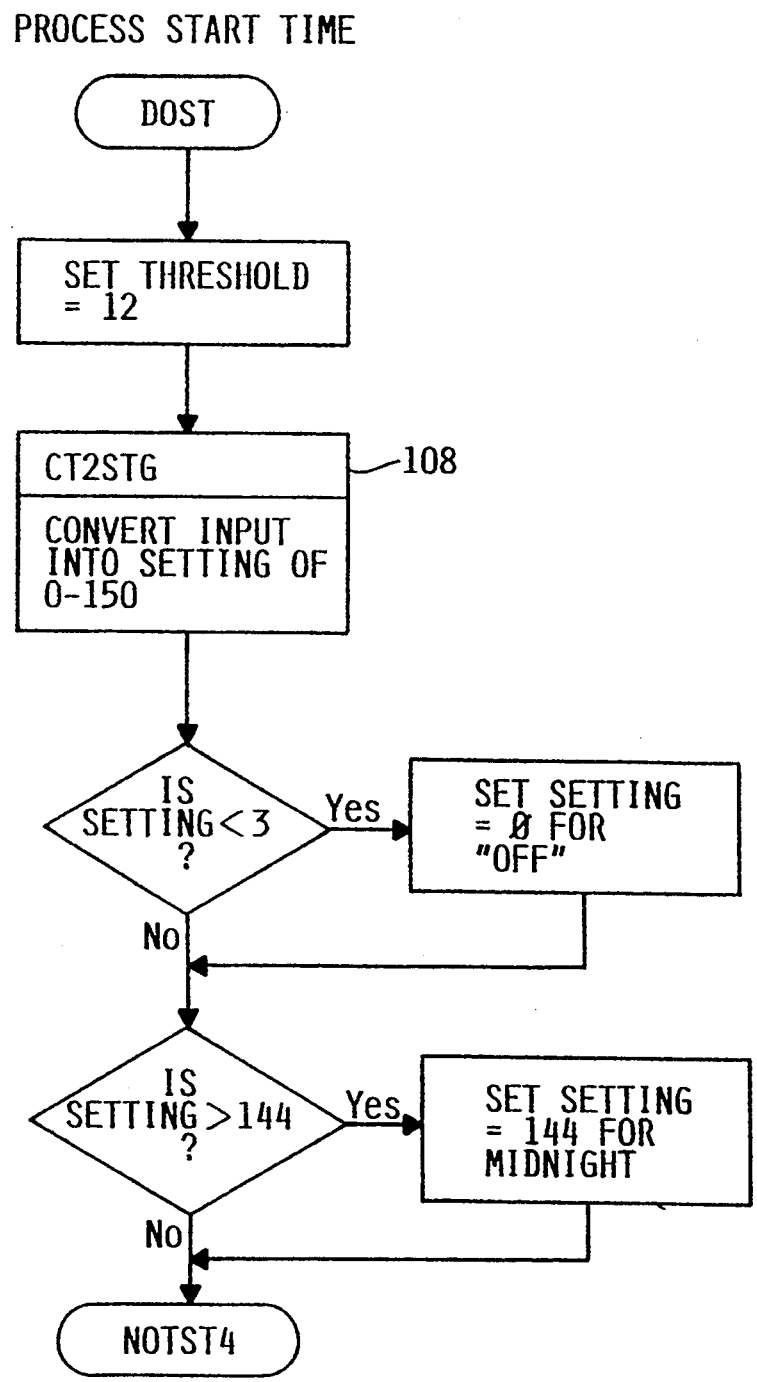
Figure 14:
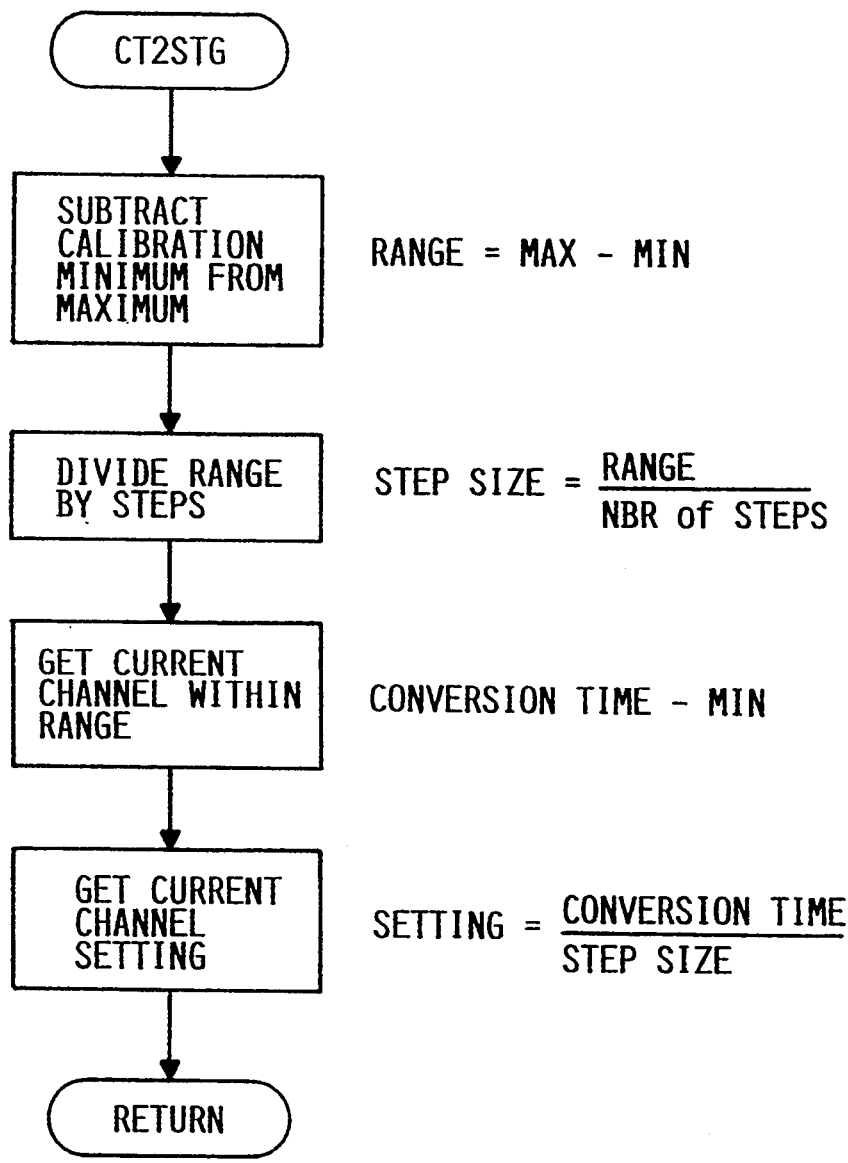

The software then takes the pot setting derived as a number from 1-144 and finishes the conversion process by returning to the DOST subroutine shown in FIG. 13. if the setting is below 3, the software sets the setting to 0 for off. If the setting is above 144, the software sets the setting to 144, corresponding to the maximum start time of 12 midnight. The DOST subroutine then continues at the NOTST4 page connector in FIG. 15. There, the setting is simply input into RAM to serve as the representation of the start time for this pot. The software takes the setting and converts the setting derived to a time of day in 10 minute increments, i.e. a setting of 36 is equal to 6 a.m., a setting of 72 to noon, and so on. This is then the start time information as stored in microcomputer 50 or as displayed in the LCD display.

As noted, a similar conversion process will be performed for each run time pot in the NOTST subroutine. The primary difference is that only 150 steps are used in figuring out step size, i.e. the maximum 90 minute run times desired for each pot, with a 30 step guard band on either side. The guard bands are used to guard against inaccuracy of the pots at very low or very high ranges. The NOTST4 subroutine is identically used for both start and run time processing.

Sensing A Pot Change

In addition to storing the pot setting in RAM for use by microcomputer 50, the NOTST4 subroutine also monitors the pot setting to detect a change in it, and to cause the pot setting to be displayed in the LCD display for a period of time, e.g. 5 seconds, if the pot is being changed. Various protective features are used in the NOTST4 subroutine to ensure that this feature is implemented only for genuine changes of the pot.

Figure 15:
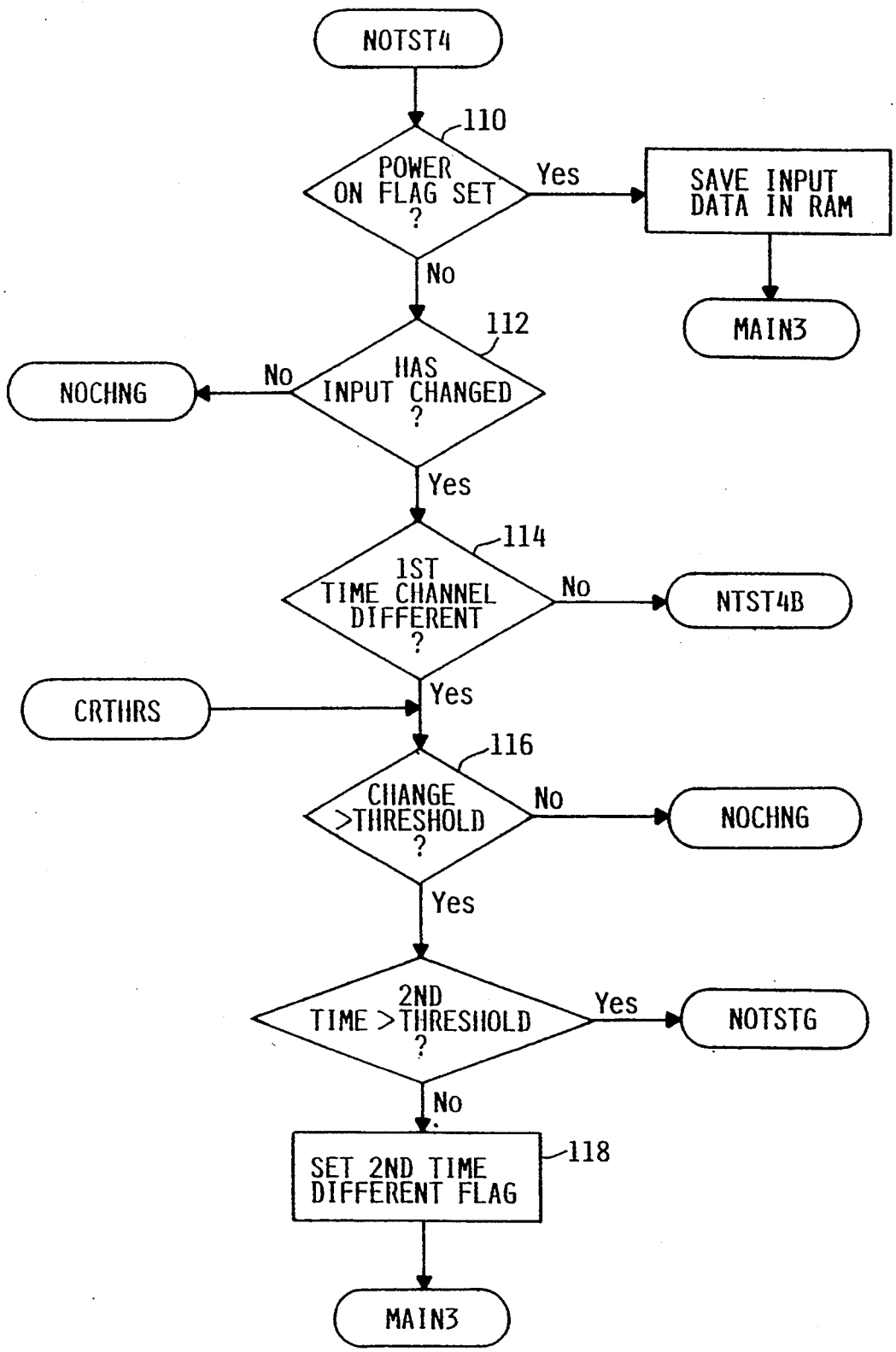

Referring to FIG. 15, the NOTST4 subroutine first determines in step 110 whether the Power On flag has been set upon initial start up of controller 2. If it has, then the pot settings read in the first pass through the analog channels will be loaded into RAM. This Power On flag is only effective for the first reading of the channels. The Power On flag will be reset after the channels have been read the first time and their settings are stored in RAM.

Figure 16:
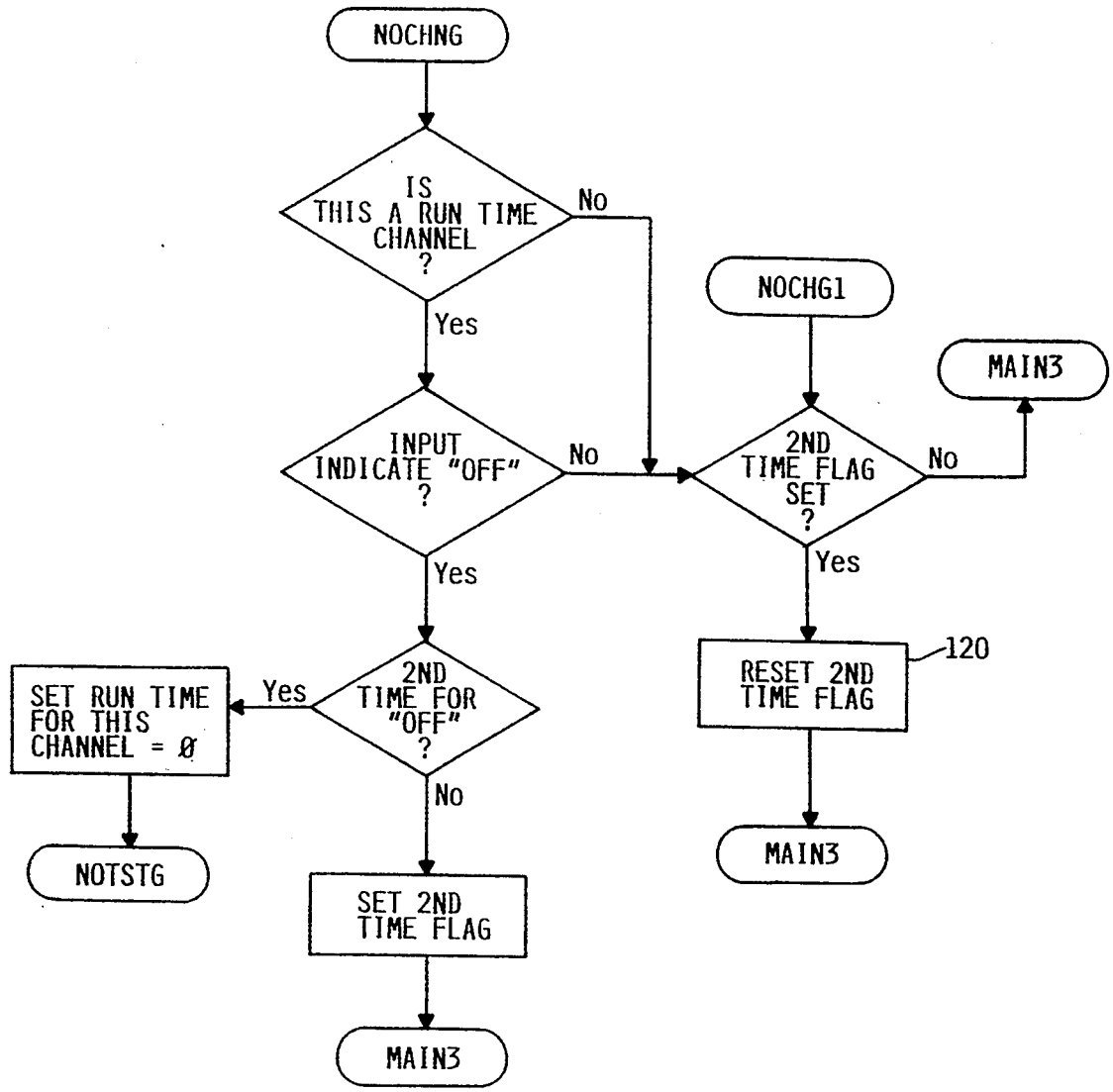

For all future channel readings, the Power On flag will not be set when reached by the NOTST4 subroutine. Then, the subroutine next asks in step 112 whether the current setting for the pot has changed from its previous setting by comparing the two settings. If the answer is no, i.e. the set tings are identical, then the software returns to the Main control loop as shown in FIG. 16 at the NOCHNG page connector. However, if the answer is yes, i.e. the setting is different, the subroutine then asks in step 114 whether this is the first time the channel is different and in step 116 whether the amount of the change, i.e. the difference between the two settings, is greater than a threshold amount (e.g. 5 counts). If it is greater than the threshold, then a 2nd Time Different Flag is set in step 118 for this pass through the subroutine.

Figure 17:
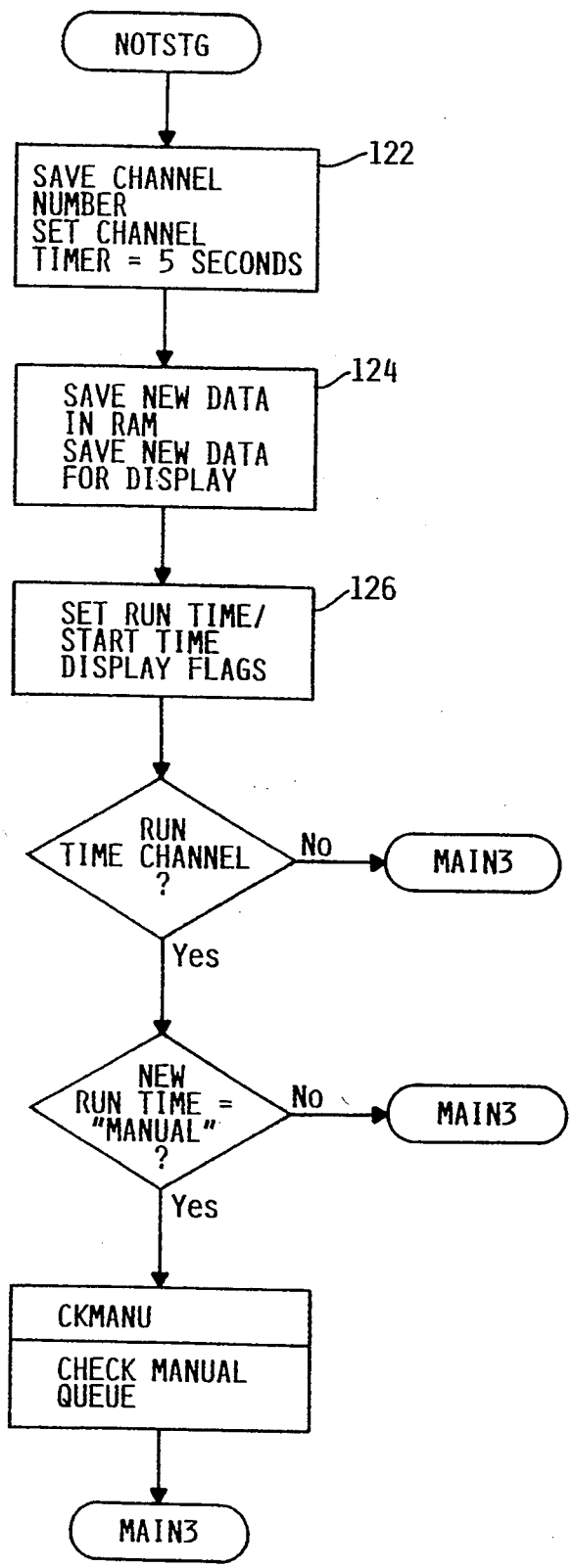
Figure 18:
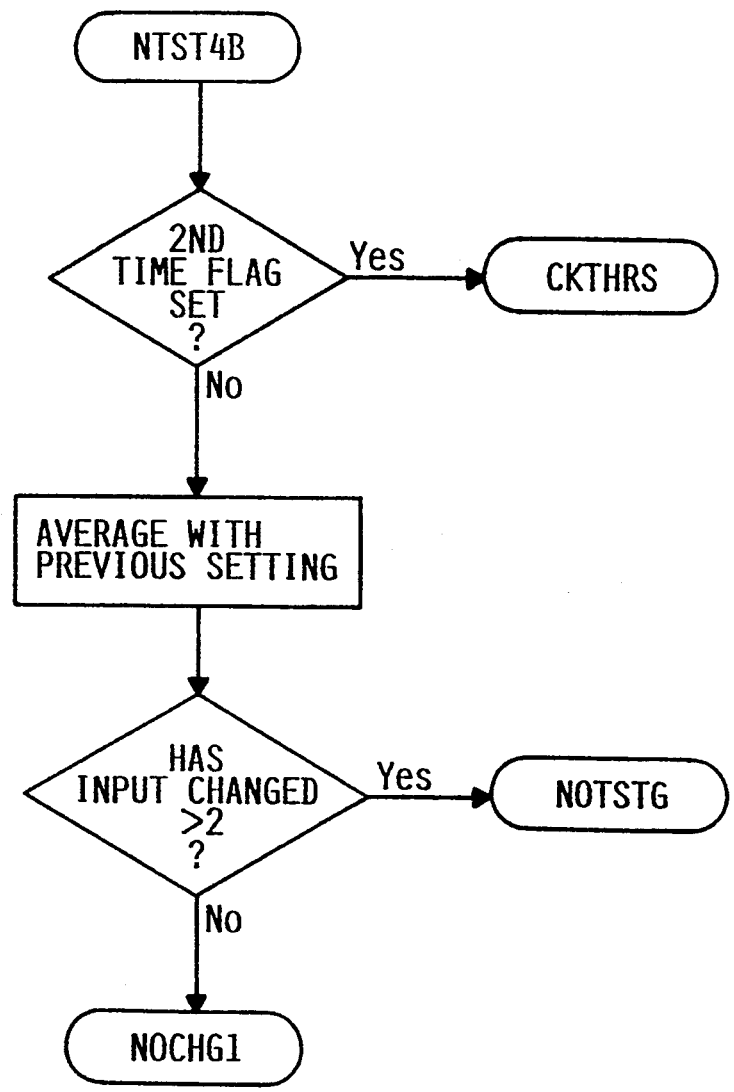

Following the setting of the 2nd Time Different Flag, when the NOTST4 subroutine repeats for the next reading of this channel, it again asks whether the reading being received is different from what's stored in RAM. If it is not, then it will again branch to the NOCHNG connector, returning to the Main control loop at MAIN3 after first resetting the 2nd time different flag in step 120. However, if the reading is still different and the change is greater than the threshold the second time as well, then the subroutine branches to the NOTST6 page connector shown in FIG. 17. There, the subroutine in step 122 remembers what channel is being read and sets a timer for 5 seconds for that channel. In step 124 the new setting is placed into RAM for use in the irrigation program and for display by the LCD display for the 5 seconds the channel timer is active. After the channel timer times out, the LCD display reverts to displaying the current day and time. The subroutine also decides in step 126 whether it is a run time or start time that should be displayed and sets the appropriate flags. The subroutine then branches back to the Main control loop at MAIN3 after determining whether the controller should be in manual operation, a feature not described herein.

Accordingly, the software will filter out apparent pot changes caused by noise from real pot changes by requiring two consecutive pot readings to pass a threshold test before the reading is accepted by microcomputer 50 for storage and display. This will be sufficient in most cases to cause only real pot changes to be recognized. The amount of the threshold used in the threshold test can obviously be varied as well.

Control Loop at MAIN3

The main control loop processing described previously has been basically to read the various switches and pots and to process the pot information as described. The main control loop processing continues thereafter at MAIN3. Many of the control steps in the rest of this loop are conventional and may have different specific forms. Thus, only a cursory description of some of these steps will be provided.

Microcomputer 50 uses the 50 hz or 60 hz timing tick to update the real time in the DOTIME subroutine. The minutes, hours and days will be incremented as time elapses in one minute increments. When a rain delay count has been established in the DOSWCH subroutine, this count will be decremented at midnight of each day, i.e. at a day change, by the DOTIME subroutine. Thus, if the rain delay count is currently 3, the count will be changed to 2 when the DOTIME subroutine detects a change from the current day to the next day.

In the DOTIME subroutine, various steps can be provided to check and see if the current day is an active day and the current time is a start time. If both conditions are present, then the start time will be put into an automatic queue. For each start time loaded into queue, the DOTIME subroutine will cause the irrigation pump to be turned on by activating the appropriate terminal on terminal strip 12. Pump activation supplies pressurized fluid to all the stations of the irrigation system. The DOTIME subroutine then checks in each execution the irrigation status of the various stations by sequentially testing whether a particular station has a run time and whether that run time has elapsed. When one station run time has elapsed, the subroutine tests the next station, and so on, until all station run times have elapsed. The appropriate output TRIAC to each station is closed until that station times out. After the run times for all stations have timed out, the DOTIME subroutine will turn off the irrigation pump and remove the start time from the queue. No watering takes place unless another start time is already in queue awaiting execution or until a new start time is loaded into queue by the passage of time.

Rain Delay Implementation

As previously set forth, a rain delay counter is maintained in microcomputer 50 corresponding to the number of days in which no irrigation is to take place. This is implemented by the DOSWCH subroutine in which the processing of the various push and slide buttons takes place.

Figure 19:
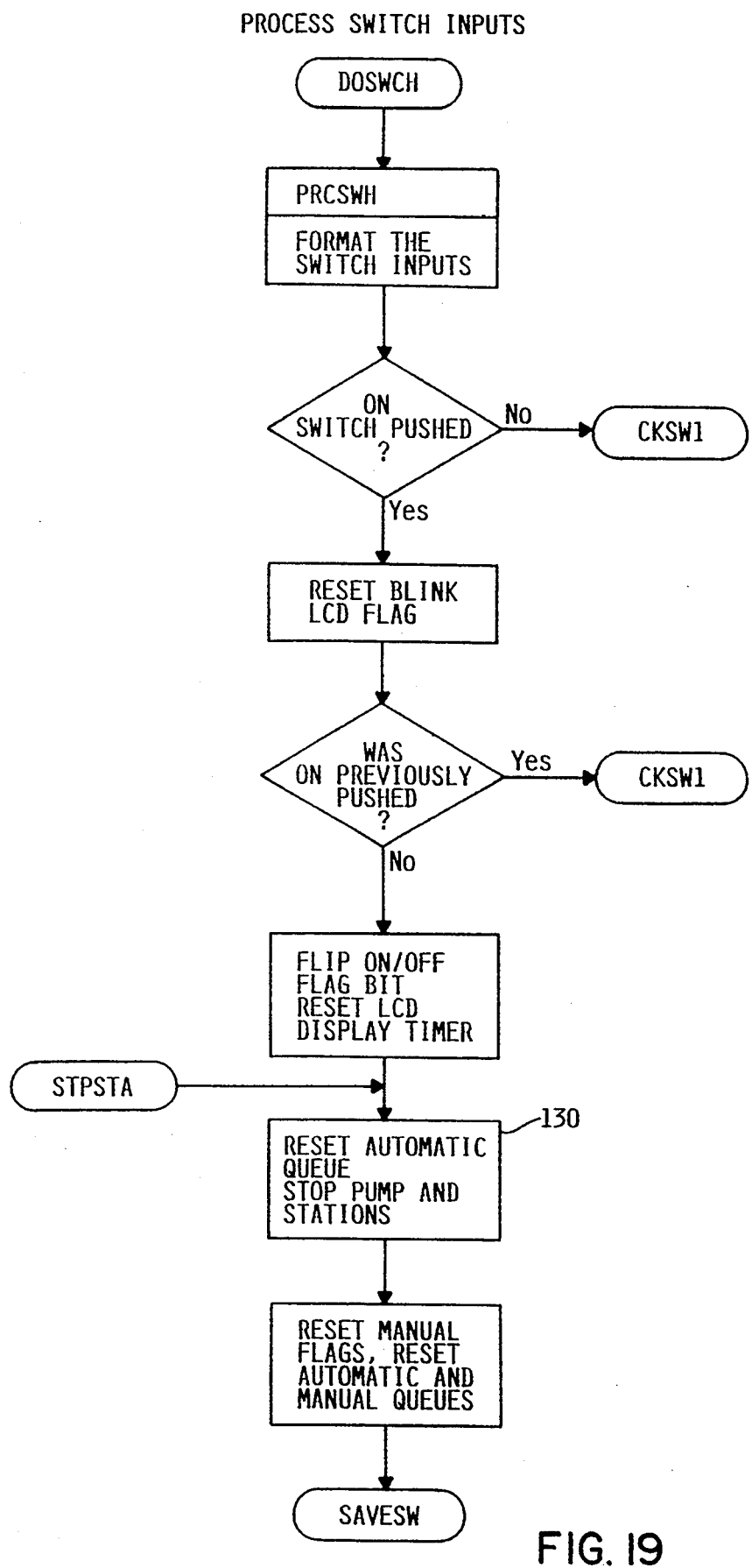

The DOSWCH subroutine begins as shown in FIG. 19. The first button processed is the on/off switch. Assuming controller 2 is "ON" and this switch is pushed, this is detected and the on/off flag bit will be set to indicate an "OFF" mode. The second test of whether the on button was previously pushed is to allow the software to recognize a situation in which the button is held down and count that as a only a single button actuation. However, for a legitimate actuation of the button from "ON" to "OFF", the automatic queue will be reset, thereby removing any scheduled watering cycles that were or would be implemented and stopping the pump activity. This is indicated in the step 130 immediately beneath the STPSTA page connector. The new status of the on/off switch is stored in RAM at SAVESW for use the next time in determining if the on/off switch has been pushed when the switch position is read.

Figure 20:
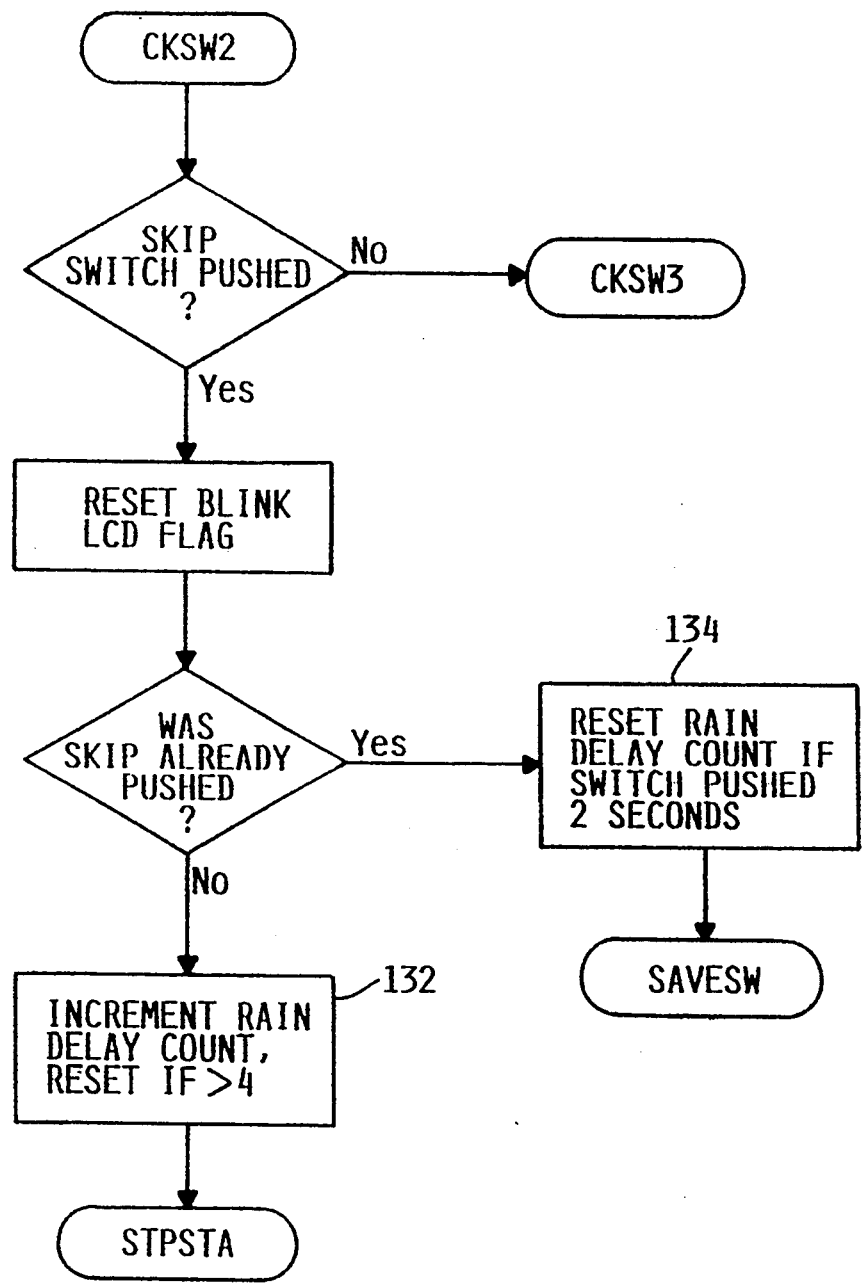

However, if the current state of the on/off switch is stored as "ON" and no actuation of the on/off switch is detected, then the DOSWCH subroutine will sequentially process all of the other push and slide buttons one by one, including the rain delay switch 47 which is also referred to as the skip switch in FIG. 20. Referring to FIG. 20, that portion of the flowchart illustrating the rain delay processing is shown. In that processing, the software determines if the rain delay button 47 is being pushed. If it is counting a held button as one push, the rain delay count is incremented in step 132 successively by one for each push of the switch. If the rain delay button is pushed more than four times sequentially, then the rain delay count is reset to zero. Another alternative method of resetting the rain delay count is to depress and hold the button for more than 2 seconds as shown in step 134. However, if the rain delay count has been incremented to some number equal to or less than four, then the software branches back to the STPSTA page connector in FIG. 19, to reset the automatic queue and inhibit any further watering in step 130. This inhibition will continue as long as the rain delay count is greater than zero.

Figure 21:
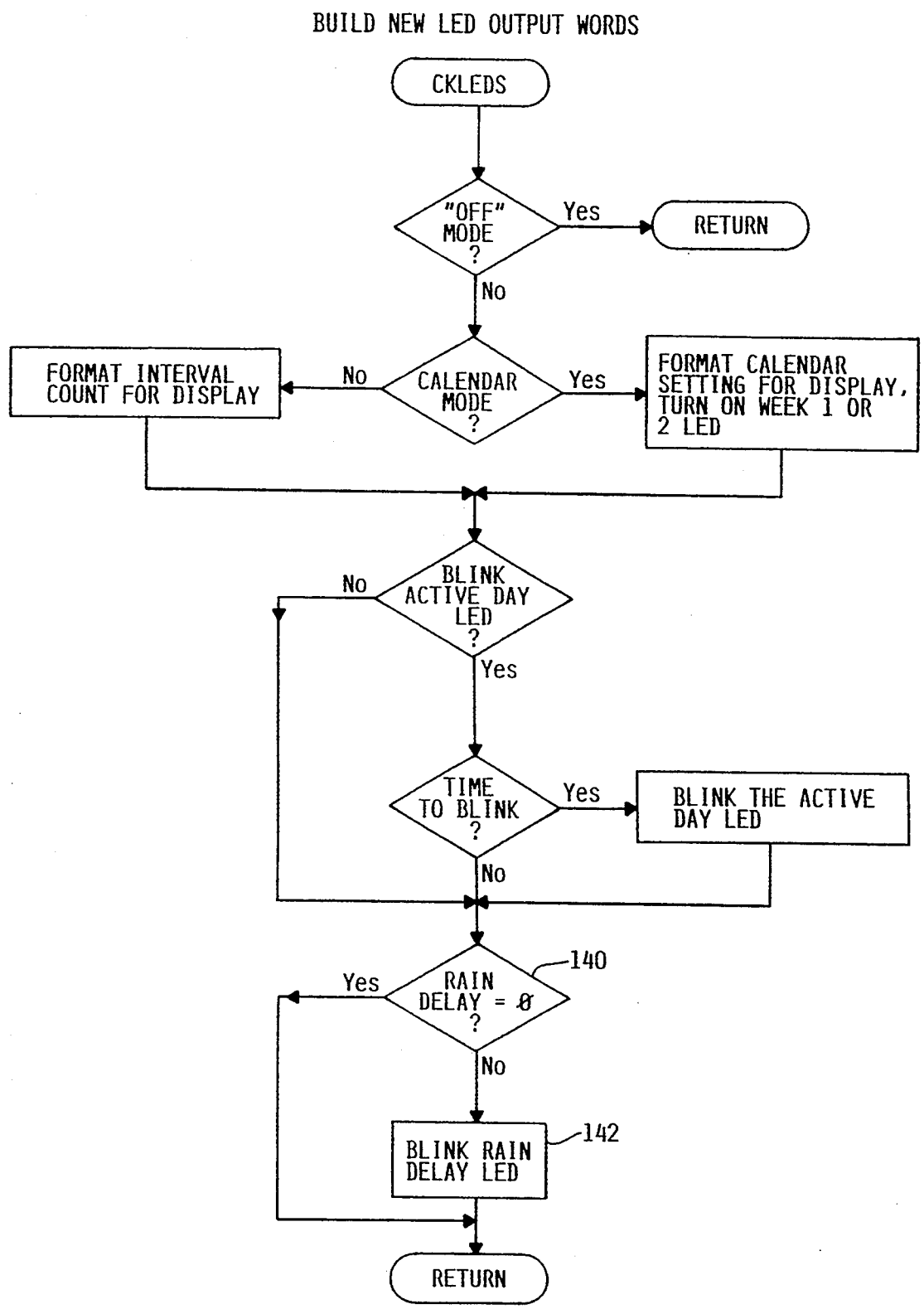

As noted previously, the status of the rain delay count is desirably illustrated graphically in the rain delay LED 48 by the flash pattern described earlier in FIG. 6. This is accomplished in the CKLEDS step of the MAIN3 portion of the main control loop, which is shown herein as FIG. 21. In this step, the software generates the word or bit information necessary to light the LED's in an appropriate fashion. One step 140 is to query the status of the rain delay count. If the rain delay count is greater than zero, then the flashing of the rain delay LED is enabled in step 142 as part of the CKLEDS step of the main control loop.

The Self Test Feature

Controller 2 desirably includes a self test routine that may be selectively implemented to determine if controller 2 is functioning properly. Step 150 in the main control loop, as shown in FIG. 12, desirably implements the self test routine identified as "SLFTST".

Figure 22:
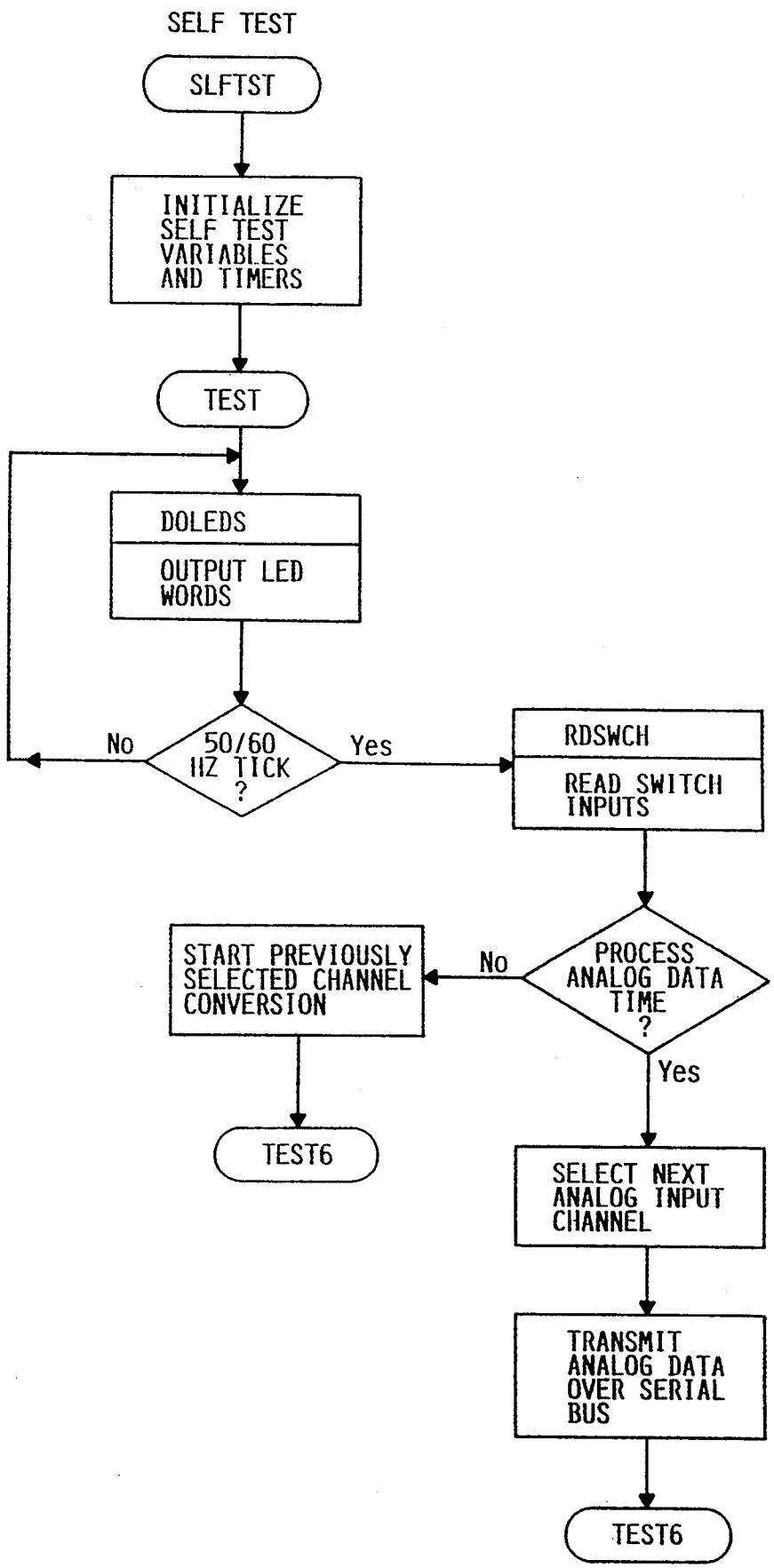

Referring first to FIG. 22, self test is initiated by pressing and holding set time button 16 and set day button 18 while applying power to the controller. Alternatively, the self test feature can be initiated by grounding a self test switch input on a port of microcomputer 50.

Figure 23:
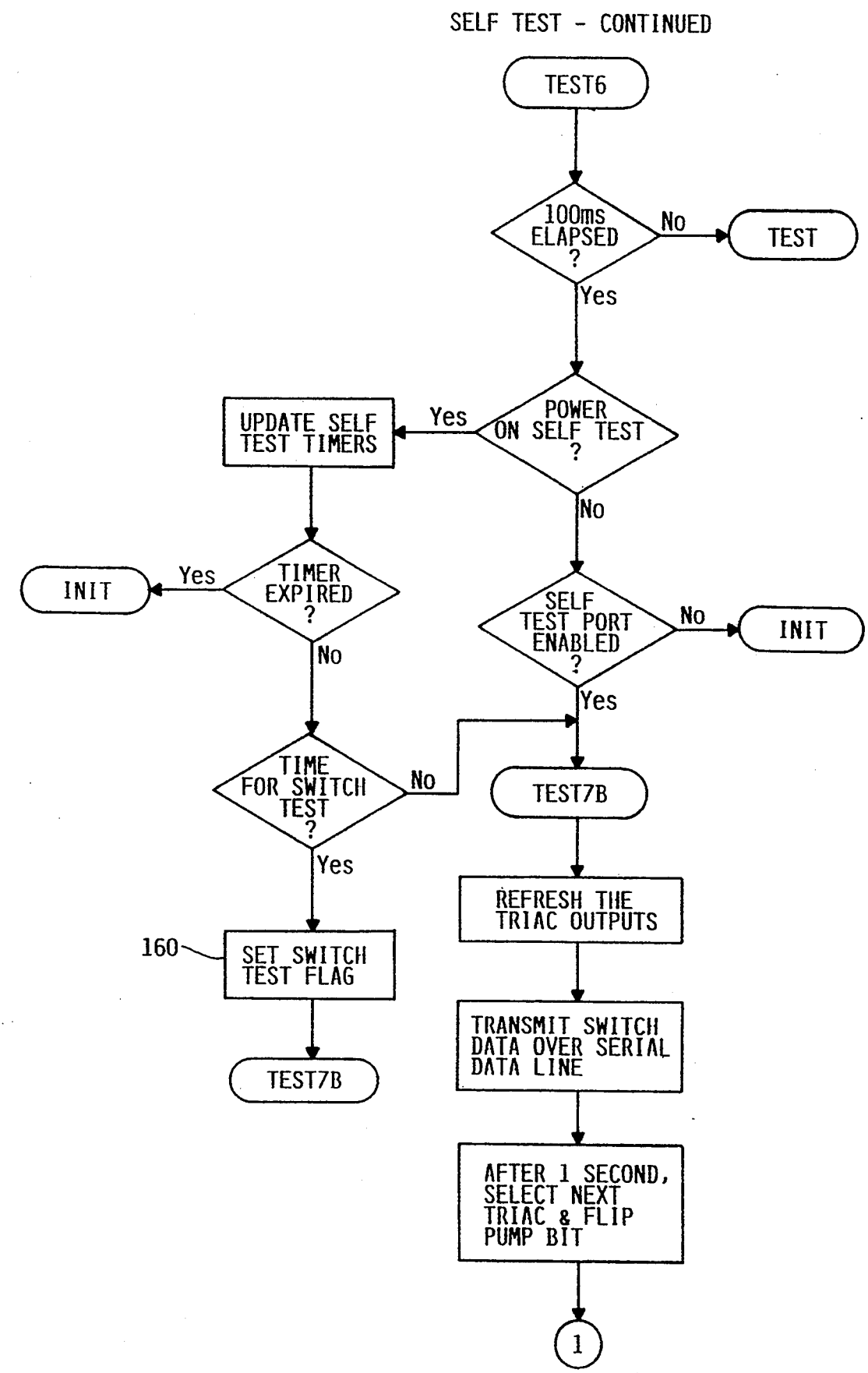
Figure 24:
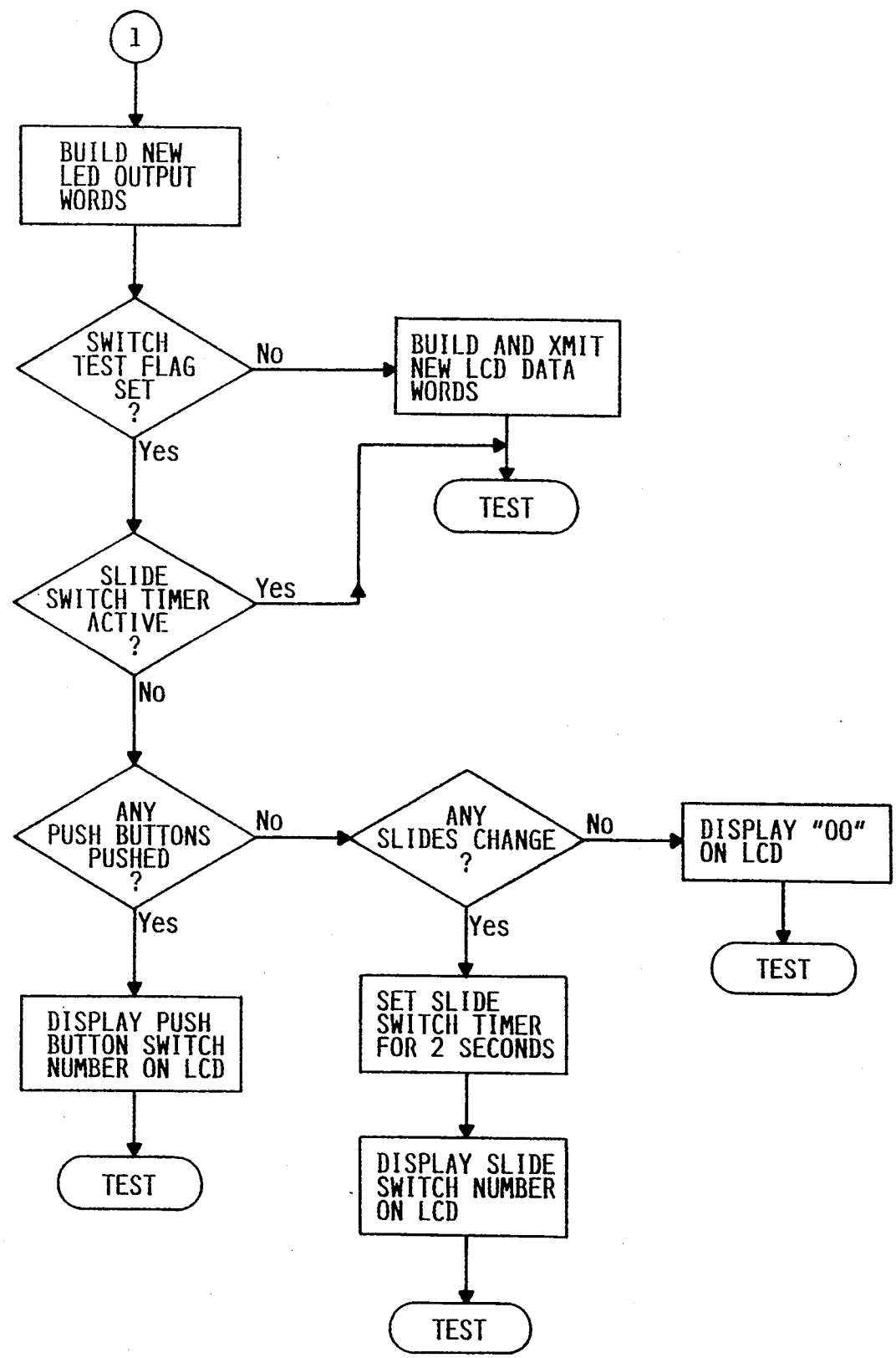

Referring to FIGS. 22-24, at SLFTST the program initializes the Ram variables and timers that will be used by self test. This includes a self test timer which will cause the program to exit the self test mode and resume the irrigation controller mode when sufficient time has elapsed if the self test was initiated by pressing the switches when power was turned on. This is a safety feature to prevent the controller from inadvertently getting stuck in self test.

At the label TEST, there is a loop that calls the LED subroutine DOLEDS while waiting for a 50 or 60 hertz timing tick to occur. When the tick does occur, the subroutine RDSWCH is called which reads all the switches and stores them in RAM for future use. The pot settings are then read one channel at a time and transmitted over the serial data bus. The reading of the pots is as previously described, in a ping pong fashion with every other tick selecting the analog channel and the next tick processing that information. In the case of SLFTST, however, the processing simply consists of transmitting the raw data over the serial data bus.

At the label TEST6 in FIG. 23, another loop occurs waiting for 100 milliseconds to elapse. When this is detected, the loop determines the type of self test that has been initiated. If the self test was begun by holding switches 16 and 18 down while applying power, then the self test timer is updated and tested. When the timer expires, the self test mode is exited for the irrigation controller mode at INIT. If the self test was initiated by the grounding of the self test pin, then the pin is again tested to determine if it is still grounded. Selectively ungrounding the pin returns the program from the self test mode to the irrigation controller mode, again at INIT.

Assuming however that it is not time to end the self test, regardless of the type initiated, at TEST7B the triac output words are output to turn the TRIAC being tested on to determine if that TRIAC is operative, i.e. whether the station connected to that TRIAC will water properly. For example, a set of test lights can be wired to the terminals on terminal strip 12 with each light coming on in turn when the appropriate TRIAC is turned on. If a light does not come on, then a fault has been detected for that TRIAC. Following the testing for a particular TRIAC, the switch information read by calling subroutine RDSWCH is transmitted over the serial data line. The next TRIAC is then selected if the previous TRIAC has been on for one second. Thus, the TRIACS will be cycled through and turned on in sequence until all the output TRIACS have been tested.

The SLFTST subroutine then branches to page connector 1 in FIG. 24. There, new LED output words are built to cause all the LED's on the front panel to blink. If a particular LED does not blink, then a fault has been detected to it. If the switch test flag is not set, then new LCD output words are built and transmitted to the LCD. This will cause the LCD to display a preset pattern to allow the operator to visually verify that all segments of the LCD are functional. After approximately 10 seconds, the switch test flag will be set at step 160 in FIG. 23.

When the switch test flag is set, the LCD can now be used for the switch test. When no push button switches are being pushed, the LCD will display "00". However, if a push button switch is pushed, then a number which is unique to that switch is displayed on the LCD for as long as the switch is held. Releasing the switch causes "00" to be displayed again. For slide switches, changing the position of the switch will cause a number unique to that switch to be displayed on the LCD for two seconds. Thus, the user can verify the operability of all the push button and slide switches on the front panel.

Thus, the SLFTST subroutine causes all of the output TRIACS to be turned on sequentially, causes all of the LED's to be blinked, and causes the LCD to display a preset test pattern. In addition, it allows the user to sequentially press or move the various push button and slide switches and determine their operability by seeing if the LCD displays the number assigned to that switch. This is a valuable diagnostic tool in determining if a fault exists and where it lies.

Various modifications of this invention will be apparent to those skilled in the art. Thus, the scope of this invention is to be limited only by the appended claims.

We claim:

1. An improved irrigation controller for individually and automatically controlling water flow to a plurality of individual watering stations in accordance with a programmed watering schedule over a period of days, the controller comprising:

a variable analog data input device for inputting into the schedule at least one selectively changeable value of at least one parameter of the schedule as a function of the position of the analog data input device relative to a housing of the controller, and wherein the analog data input device is accessible to a user for manual manipulation on the housing of the controller and is set by a user by moving the data input device on the controller housing between physically different positions relative to the controller housing with each different position of the data input device relative to the controller housing representing a different value for the parameter, wherein the analog data input device is connected between high and low reference voltages and has an output at which an output voltage may be read with the output voltage lying between the high and low reference voltages and with the output voltage varying as the analog data input device is moved between its different positions on the controller housing; and means connected to the output of the analog data input device for reading the position of the analog data input device to derive the value of the parameter which has been set by the position of the analog data input device by reading the output voltage appearing at the output of the analog data input device, which comprises:

(a) capacitor means connected to a current source for charging the capacitor means;

(b) logic and control means operatively connected to the capacitor means and to the analog data input device, the logic and control means having means for reading instantaneous values of the high and low reference voltages when reading the output voltage of the analog data input device by charging the capacitor means to the high and low reference voltages and to the output voltage of the analog data input device and by timing the amount of time it takes the capacitor means to charge to the high and low reference voltages and the output voltage of the analog data input device to derive instantaneous maximum, minimum and actual conversion times respectively; and wherein the (c) logic and control means further includes means for performing the following functions for deriving a setting for the analog data input device:

(i) for subtracting the maximum from the minimum conversion times to provide a range;

(ii) for dividing the range by a predetermined number of steps to provide a step size; and (iii) for subtracting the minimum conversion time from the actual conversion time for the analog data input device and dividing the result by the step size to arrive at a setting expressed as a number of steps in the range.

2. An improved irrigation controller as recited in claim 1, wherein the capacitor means includes a single charging capacitor, wherein the capacitor is connected to the high and low reference voltages and the output of the analog data input device by a plurality of separate channels, and further including means for sequencing through the channels to use the same capacitor in deriving the maximum, minimum and actual conversion times.

3. An improved irrigation controller as recited in claim 1, wherein the at least one parameter is a time related parameter expressed in increments from a maximum value to a minimum value expressing at least one of the time of day or an amount of time, and wherein the number of steps is at least equal to the total number of increments between the maximum and minimum value of the at least one parameter.

4. An improved irrigation controller as recited in claim 1, wherein the charging source for the capacitor means is a constant current source.

5. An improved irrigation controller as recited in claim 1, wherein the analog data input means comprises a variable potentiometer.

6. An improved irrigation controller for individually and automatically controlling water flow to a plurality of individual watering stations in accordance with a programmed watering schedule over a period of days, the controller including:

a variable analog data input device for inputting into the schedule at least one selectively changeable value of at least one parameter of the schedule as a function of the position of the analog data input device relative to a housing of the controller, and wherein the analog data input device is accessible to a user for manual manipulation on the housing of the controller and is set by a user by moving the data input device on the controller housing between physically different positions relative to the controller housing with each different position of the data input device relative to the controller housing representing a different value for the parameter, wherein the analog data input device is connected between high and low reference voltages and has an output at which an output voltage may be read with the output voltage lying between the high and low reference voltages and with the output voltage varying as the analog data input device is moved between its different positions on the controller housing; and means connected to the output of the analog data input device for reading the position of the analog data input device to derive the value of the parameter which has been set by the position of the analog data input device by reading the output voltage appearing at the output of the analog data input device, the reading means further including means for reading instantaneous values of the high and low reference voltages when reading the output voltage of the analog data input device to better calibrate the setting represented by the output voltage of the analog data input device.

7. An improved irrigation controller as recited in claim 6, wherein the analog data input means comprises a variable potentiometer.

8. An improved irrigation controller for individually and automatically controlling water flow to a plurality of individual watering stations in accordance with a programmed watering schedule over a period of days, the controller including a variable analog data input device for inputting into the schedule at least one selectively changeable value of at least one parameter of the schedule as a function of the position of the analog data input device relative to a housing of the controller, and wherein the analog data input device is accessible to a user for manual manipulation on the housing of the controller and is set by a user by moving the data input device on the controller housing between physically different positions relative to the controller housing with each different position of the data input device relative to the controller housing representing a different value for the parameter, wherein the analog data input device is connected between high and low reference voltages and has an output at which an output voltage may be read with the output voltage lying between the high and low reference voltages and with the output voltage varying as the analog data input device is moved between its different positions on the controller housing; and means connected to the output of the analog data input device for reading the position of the analog data input device to derive the value of the parameter which has been set by the position of the analog data input device by reading the output voltage appearing at the output of the analog data input device, which comprises:

a capacitor charged by a constant current source; and means for timing the amount of time it takes the capacitor to charge to the output voltage of the analog data input device.

9. An improved irrigation controller as recited in claim 8, wherein the analog data input means comprises a variable potentiometer.

10. An improved irrigation controller for individually and automatically controlling water flow to a plurality of individual watering stations in accordance with a programmed watering schedule over a period of days, the controller including:

(a) data input means for allowing the user to input a watering schedule comprising a plurality of values for at least one parameter, wherein the data input means comprises a plurality of discrete analog data input devices which correspond in number to the number of the plurality of values which may be input for the at least one parameter such that a single and different analog data input device inputs a single value for the at least one parameter into the watering schedule, wherein the analog data input devices are accessible to a user for manual manipulation on a housing of the controller and are set by a user by moving each data input device on the controller housing between physically different positions relative to the controller housing with each different position of the data input device relative to the controller housing representing a different value for the at least one chosen parameter; and wherein each analog data input device is connected between high and low reference voltages and has an output at which an output voltage may be read with the output voltage lying between the high and low reference voltages and with the output voltage thereof varying as each analog data input device is moved between its different positions on the controller housing; and (b) means connected to the outputs of all the analog data input devices for reading the positions of all the analog data input devices to derive the values of the at least one parameter which has been set by the positions of the analog data input devices by reading the output voltages appearing at the outputs of the analog data input devices, which comprises:

(i) a single capacitor charged by a current source;

(ii) means for timing the amount of time it takes the capacitor to charge to the output voltage of a selected one of the analog data input devices to thereby derive a setting corresponding to the position of the selected one of the analog data input devices; and (iii) means for sequentially charging the single capacitor and for timing the amount of time it takes the capacitor to charge to the output voltage for each of the analog data input devices such that the same capacitor is used in reading the output voltages of all of the analog data input devices, thereby to enhance the consistency of the settings derived from one analog data input device to the next.

* * * * *